(12) United States Patent
Gao

(10) Patent No.: US 11,625,920 B2
(45) Date of Patent: Apr. 11, 2023

(54) METHOD FOR LABELING PERFORMANCE SEGMENT, VIDEO PLAYING METHOD, APPARATUS AND SYSTEM

(71) Applicant: TENCENT TECHNOLOGY (SHENZHEN) COMPANY LIMITED, Guangdong (CN)

(72) Inventor: Xiaomeng Gao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/894,086

(22) Filed: Jun. 5, 2020

(65) Prior Publication Data
US 2020/0302179 A1    Sep. 24, 2020

Related U.S. Application Data

(63) Continuation of application No. PCT/CN2019/074205, filed on Jan. 31, 2019.

(30) Foreign Application Priority Data

Feb. 13, 2018  (CN) .......................... 201810149601.7

(51) Int. Cl.
H04N 5/445         (2011.01)
G06V 20/40         (2022.01)
(Continued)

(52) U.S. Cl.
CPC .............. *G06V 20/41* (2022.01); *G06V 20/46* (2022.01); *G06V 40/169* (2022.01);
(Continued)

(58) Field of Classification Search
CPC .......... G06K 9/00718; G06K 9/00275; G06K 9/00744; G06K 9/00765; H04N 21/44008;
(Continued)

(56) References Cited

U.S. PATENT DOCUMENTS 8,718,337 B1 *   5/2014   Syrett ................ G06K 9/00288
                                                          382/118
9,900,632 B1 *   2/2018   Flores Guerra ..... G06F 16/7867
(Continued)

FOREIGN PATENT DOCUMENTS

| CN | 103488764 A | 1/2014 |
| CN | 104038848 A | 9/2014 |

(Continued)

OTHER PUBLICATIONS

International Search Report for PCT/CN2019/074205 dated Apr. 16, 2019 [PCT/ISA/210].
(Continued)

*Primary Examiner* — Annan Q Shang
(74) *Attorney, Agent, or Firm* — Sughrue Mion, PLLC

(57) ABSTRACT

Provided is a method for labeling a segment of a video, in a server. In the method, a multimedia file corresponding to an acting role is obtained. A role feature of the acting role is determined based on the multimedia file. A target video is decoded to obtain a data frame and a playing timestamp corresponding to the data frame, the data frame including at least one of a video frame and an audio frame. In the data frame of the target video, a target data frame that matches the role feature is identified. A segment related to performance of the acting role in the target video is automatically labeled based on a playing timestamp of the target data frame.

19 Claims, 22 Drawing Sheets

(51) Int. Cl.
  *H04N 21/44*  (2011.01)
  *H04N 21/81*  (2011.01)
  *H04N 21/84*  (2011.01)
  *G06V 40/16*  (2022.01)

(52) U.S. Cl.
  CPC ... *H04N 21/44008* (2013.01); *H04N 21/8133* (2013.01); *H04N 21/84* (2013.01)

(58) Field of Classification Search
  CPC .. H04N 21/8133; H04N 21/84; H04N 21/233; H04N 21/6587; H04N 21/47202; H04N 21/23418; H04N 21/26603; H04N 21/8549; H04N 21/8456; H04N 21/8547; H04N 21/234; H04N 21/4394
  See application file for complete search history.

(56) References Cited

U.S. PATENT DOCUMENTS

| | | | | |
|---|---|---|---|---|
| 2007/0286463 | A1* | 12/2007 | Ritzau | G06K 9/228 382/118 |
| 2011/0103766 | A1* | 5/2011 | Priddle | H04N 21/845 386/241 |
| 2012/0290494 | A1* | 11/2012 | Haimovitz | G06Q 10/1053 705/321 |
| 2012/0291056 | A1* | 11/2012 | Donoghue | H04N 21/4722 725/41 |
| 2013/0110825 | A1* | 5/2013 | Henry | G06F 16/951 707/723 |
| 2013/0238594 | A1* | 9/2013 | Hong | G06F 16/24578 707/710 |
| 2014/0037264 | A1* | 2/2014 | Jackson | H04N 21/44008 386/230 |
| 2015/0037777 | A1* | 2/2015 | Kushner | H04N 21/44218 434/307 A |
| 2015/0243327 | A1* | 8/2015 | Zhang | H04N 21/47202 725/88 |
| 2015/0365725 | A1* | 12/2015 | Belyaev | H04N 21/8133 725/46 |
| 2017/0337287 | A1* | 11/2017 | Gill | G06F 16/9537 |
| 2018/0268022 | A1* | 9/2018 | Rose | G06F 16/2455 |
| 2018/0288483 | A1* | 10/2018 | Wang | H04N 21/4725 |
| 2019/0191218 | A1* | 6/2019 | Cormican | H04N 21/4722 |

FOREIGN PATENT DOCUMENTS

| | | |
|---|---|---|
| CN | 104662894 A | 5/2015 |
| CN | 105354543 A | 2/2016 |
| CN | 106021496 A | 10/2016 |
| CN | 108337532 A | 7/2018 |

OTHER PUBLICATIONS

Written Opinion for PCT/CN2019/074205 dated Apr. 16, 2019 [PCT/ISA/237].
Chinese Office Action for 201810149601.7 dated Feb. 13, 2018.

* cited by examiner

METHOD FOR LABELING PERFORMANCE SEGMENT, VIDEO PLAYING METHOD, APPARATUS AND SYSTEM

CROSS-REFERENCE TO RELATED APPLICATION(S)

This application is a bypass continuation application of International Application No. PCT/CN2019/074205, filed on Jan. 31, 2019, which claims priority to Chinese Patent Application No. 201810149601.7, filed on Feb. 13, 2018 and entitled "METHOD FOR LABELING PERFORMANCE SEGMENT, VIDEO PLAYING METHOD, APPARATUS AND SYSTEM", the disclosures of which are incorporated herein by reference in their entireties.

FIELD

Example embodiments of the disclosure relate to the technical field of multimedia, and in particular, to a method for labeling a performance segment, a video playing method, a video playing apparatus and a video playing system.

BACKGROUND

In response to user's personal preferences or time limit requirements, a video playing application (APP) may provide a watch-him-only function. The watch-him-only function is a function of enabling watching of only performance segments of a specific acting role in a video.

An operation editor can only manually label performance segment information of some acting roles. Therefore, the labeling of the performance segment information has low precision and low efficiency. After a television (TV) program is live broadcasted, it generally takes several days to provide a watch-him-only function of the TV program.

SUMMARY

One or more example embodiments provide a method for labeling a performance segment, and a video playing method, a video playing apparatus, and a video playing system to solve the problem in the related art of low precision and low efficiency of video labeling performed manually by an operation editor.

According to an aspect of an example embodiment, there is provided a method for labeling a segment of a video, in a server. In the method, a multimedia file corresponding to an acting role is obtained. A role feature of the acting role is determined based on the multimedia file. A target video is decoded to obtain a data frame and a playing timestamp corresponding to the data frame, the data frame including at least one of a video frame and an audio frame. In the data frame of the target video, a target data frame that matches the role feature is identified. A segment related to performance of the acting role in the target video is automatically labeled based on a playing timestamp of the target data frame.

The role feature may include a voiceprint feature of the acting role, and the identifying the target data frame may include: identifying, in the audio frame of the target video, a target audio frame that matches the voiceprint feature.

The obtaining the multimedia file may include: obtaining in-play audio data of the acting role, the in-play audio data being audio data of the acting role in the target video, and the voiceprint feature may include the voiceprint feature of the acting role extracted from the in-play audio data.

The obtaining the multimedia file may include: obtaining a cast list of the target video; and performing (i) capturing actor audio data from a network resource based on a name of a voice actor of the acting role in the cast list, or (ii) based on a determination that the name of the voice actor of the acting role does not exist in the cast list, obtaining a name of a leading actor of the acting role, and capturing actor audio data from the network resource based on the name of the leading actor, and the role feature may include an audio feature of the acting role extracted from the actor audio data.

The role feature may include a face feature of the acting role, and the identifying the target data frame may include: identifying, in an image frame of the target video, a target image frame that matches the face feature.

The obtaining the multimedia file may include: obtaining stills image data of the acting role, the stills image data being stills of the acting role in the target video, and the role feature may include a face feature of the acting role extracted from the stills image data.

The obtaining the multimedia file may include: obtaining a cast list of the target video; and capturing an actor image from a character encyclopedia page based on an actor name of the acting role in the cast list, and the role feature may include a face feature of the acting role extracted from the actor image.

The method may further include: based on at least two actor images corresponding to the actor name in the character encyclopedia page, obtaining an image shooting time corresponding to the at least two actor images; and extracting the face feature from an acting role image of which the image shooting time is closest to a video shooting time of the target video.

The automatically labeling may include: based on the target data frame including at least one target image frame, combining consecutive timestamps of the at least one target image frame to obtain at least one piece of first segment information of the acting role; or based on the target data frame including at least one target audio frame, combining consecutive timestamps of the at least one target audio frame to obtain at least one piece of second segment information of the acting role; or based on the target data frame including the at least one target image frame and the at least one target audio frame, combining consecutive timestamps of the at least one target image frame to obtain the at least one piece of first segment information of the acting role; combining consecutive timestamps of the at least one target audio frame to obtain the at least one piece of second segment information of the acting role; and obtaining third segment information of the acting role based on a combination of at least one piece of the first segment information and at least one piece of the second segment information.

According to an aspect of an example embodiment, there is provided a video playing method, in a terminal. In the method, information of the segment related to the performance of the acting role in the target video is obtained, the segment being automatically labeled according to the above method. A playing interface of the target video is displayed, and a watch setting control of at least one acting role is displayed on the playing interface. Based on an operation received on the watch setting control, a watching attribute of the acting role is determined. The target video is played based on the watching attribute and the information of the segment automatically labeled.

The playing the target video may include performing at least one of: based on the watching attribute of the acting role being a watch-only attribute, playing a segment corresponding to the acting role based on the information of the segment; based on the watching attribute of the acting role being an ignore attribute, skipping the segment corresponding to the acting role based on the information of the segment; or based on the watching attribute of the acting role being a quick watch attribute, fast forwarding the segment corresponding to the acting role based on the information of the segment.

The playing the segment corresponding to the acting role may include: based on at least two first acting roles having the watch-only attribute, playing segments corresponding to combined information of segments of the at least two first acting roles, the skipping the segment corresponding to the acting role may include: based on at least two second acting roles having the ignore attribute, skipping segments corresponding to combined information of segments of the at least two second acting roles, and the fast forwarding the segment corresponding to the acting role may include: based on at least two third acting roles having the quick watch attribute, fast forwarding segments corresponding to combined information of segments of the at least two third acting roles.

The displaying the watch setting control may include: displaying the watch setting control on the playing interface, the watch setting control including a setting area of a target watching attribute, role elements of N (N being a positive integer) acting roles being displayed in the setting area, and the role elements including at least one of a role avatar, an actor name, an acting role name, and a check box, and the determining the watching attribute of the acting role may include: receiving a selection signal for selecting a role element among the N acting roles; and setting a watching attribute of an acting role corresponding to the selected role element among the N acting roles to the target watching attribute.

The displaying the watch setting control may include: receiving a hold-to-select operation on the playing interface; determining an acting role corresponding to a face selected through the hold-to-select operation; and displaying a watch setting control corresponding to the determined acting role.

The displaying the watch setting control may include: receiving an area selection operation on the playing interface; determining an acting role within an area selected through the area selection operation; and displaying a watch setting control corresponding to the determined acting role.

The displaying the watch setting control of the acting role may include: receiving a gesture selection operation on the playing interface; determining an acting role corresponding to a face selected through the gesture selection operation; and displaying a watch setting control corresponding to the determined acting role.

The displaying the playing interface of the target video may include: displaying a playing interface that has a playing window of the target video, a playing progress bar on the playing window displaying at least one performance segment of the target video, and each performance segment corresponding to each segment related to performance of a respective acting role.

According to an aspect of an example embodiment, there is provided an apparatus for labeling a segment of a video, including: at least one memory configured to store program code; and at least one processor configured to read the program code and operate as instructed by the program code, the program code including: obtaining code configured to cause at least one of the at least one processor to obtain a multimedia file corresponding to an acting role; determining code configured to cause at least one of the at least one processor to determine a role feature of the acting role based on the multimedia file; decoding code configured to cause at least one of the at least one processor to decode a target video to obtain a data frame and a playing timestamp corresponding to the data frame, the data frame including at least one of a video frame and an audio frame; identification code configured to cause at least one of the at least one processor to identify, in the data frame of the target video, a target data frame that matches the role feature; and labeling code configured to cause at least one of the at least one processor to automatically label a segment related to performance of the acting role in the target video based on a playing timestamp of the target data frame.

According to an aspect of an example embodiment, there is provided a video playing apparatus, including: at least one memory configured to store program code; and at least one processor configured to read the program code and operate as instructed by the program code, the program code including: obtaining code configured to cause at least one of the at least one processor to obtain the information of the segment related to the performance of the acting role in the target video, the segment being automatically labeled according to the method of claim 1; display code configured to cause at least one of the at least one processor to display a playing interface of the target video, the display code being further configured to cause at least one of the at least one processor to display a watch setting control of at least one acting role on the playing interface; determining code configured to cause at least one of the at least one processor to determine, based on an operation received on the watch setting control, a watching attribute of the acting role; and the display code being further configured to cause at least one of the at least one processor to play the target video based on the watching attribute and the information of the segment automatically labeled.

According to an aspect of an example embodiment, there is provided a non-transitory computer readable storage medium, storing program code executable by at least one processor to cause the at least one processor to perform a method for labeling a segment of a video: obtaining a multimedia file corresponding to an acting role; determining a role feature of the acting role based on the multimedia file; decoding a target video to obtain a data frame and a playing timestamp corresponding to the data frame, the data frame including at least one of a video frame and an audio frame; identifying, in the data frame of the target video, a target data frame that matches the role feature; and automatically labeling a segment related to performance of the acting role in the target video based on a playing timestamp of the target data frame.

The technical solutions provided in the embodiments of the disclosure bring at least the following beneficial effects:

The role feature of the acting role is determined according to the multimedia file of the acting role; the target data frame that matches the role feature is identified in the target video, and the performance segment information corresponding to the acting role is automatically labeled according to the playing timestamp of the target data frame, so that a server can automatically label a large number of target videos in batches. This solves the problem of low precision and low efficiency caused by an operator editor's manual labeling of videos, and achieves an effect of efficiently labeling the performance segment information of the target videos in a limited time (such as a time limit of launching a new TV series). In addition, because the labeling in the embodiments of the disclosure uses a data frame as a granularity, the labeling precision is much higher than that of the manual labeling of the operation editor, thereby improving accuracy of labeling the performance segment information.

BRIEF DESCRIPTION OF THE DRAWINGS

To describe the technical solutions of the example embodiments of the disclosure more clearly, the following briefly introduces the accompanying drawings for describing the example embodiments. Apparently, the accompanying drawings in the following description show only some embodiments of the disclosure, and a person of ordinary skill in the art may still derive other accompanying drawings from these accompanying drawings without creative efforts.

DETAILED DESCRIPTION

To make the objectives, technical solutions, and advantages of the disclosure clearer, the following further describes implementations of the disclosure in detail with reference to the accompanying drawings.

As used herein, the term "and/or" includes any and all combinations of one or more of the associated listed items. Expressions such as "at least one of" when preceding a list of elements, modify the entire list of elements and do not modify the individual elements of the list. For example, the expression "at least one of a, b, and c," should be understood as including only a, only b, only c, both a and b, both a and c, both b and c, or all of a, b, and c.

The terms "first", "second", and the like may be used to describe various configuration elements, but configuration elements should not be limited by the terms. The terms are only used to distinguish one configuration element from another configuration element.

A singular expression includes multiple expressions unless the context clearly indicates otherwise. In addition, when a part is described to "include" a certain configuration element, which means that the part may further include other configuration elements, except to exclude other configuration elements unless otherwise stated.

In addition, a term " . . . unit", " . . . module", or the like described in the specification means a unit for processing at least one function or operation, which may be implemented by hardware or software, or a combination of the hardware and the software.

Figure 1:
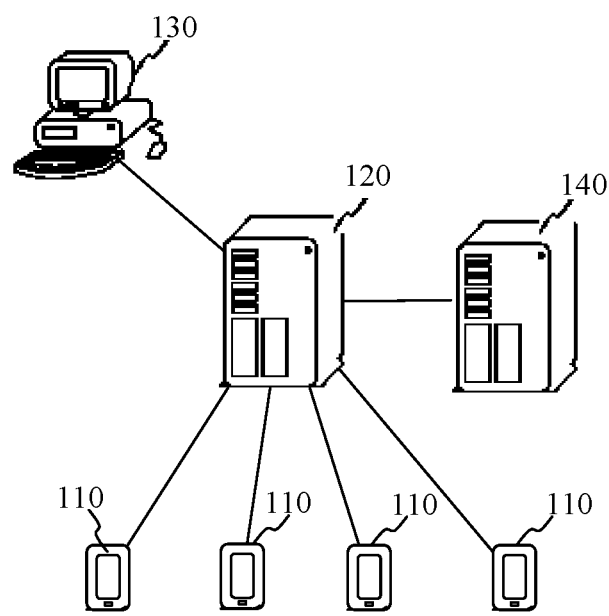
FIG. 1 is a structural block diagram of a video playing system according to an example embodiment of the disclosure.

FIG. 1 is a structural block diagram of a video playing system according to an example embodiment of the disclosure. The video playing system includes: a terminal 110, a video server (a video storage server) 120, a management terminal 130, and a network resource server 140.

The terminal 110 may be a mobile phone, a tablet computer, an e-book reader, a Moving Picture Experts Group Audio Layer III (MP3) player, a Moving Picture Experts Group Audio Layer IV (MP4) player, a laptop computer, a desktop computer, or the like. An application capable of playing videos is installed in the terminal 110. The application may be at least one of the following: a browser, an online video playing APP, an offline video playing APP, a short video playing APP, and a news APP. The terminal 110 may transmit a video playing request to the video server 120. The video playing request is used to request playing of a target video.

The terminal 110 is connected to the video server 120 through a network. The network is a wireless network or a wired network.

The video server 120 is configured to provide an online video playing service. The video server 120 stores video data of multiple videos. Optionally, performance segment information of acting roles related to all or part of the videos is also stored. The same target video has performance segment information of one or more acting roles. The performance segment information may be information indicating a segment in which an acting role shows up in the target video. The term "show up" means appearing in a displayed picture of the video, and/or a voice sounding in a script line or a background sound of the video.

Based on the video playing request received from the terminal 110, the video server 120 may transmit a target video to the terminal 110. In a case that performance segment information of at least one acting role is stored in associated with the target video, the video server 120 may also transmit the performance segment information of at least one acting role to the terminal 110.

The video server 120 may be configured to automatically label all or part of target videos, to obtain labeled performance segment information of each acting role. The disclosure is not limited to this example, and in example embodiments, the video server 120 may be split into multiple servers such as one or more video storage servers, and one or more video labeling servers, or may be implemented as multiple virtual machines on a virtualized platform.

The video server is also connected to the management terminal 130 through a network. The network is a wireless network or a wired network.

The management terminal 130 is a terminal used by an operation editor. The operation editor may use the management terminal 130 to upload a video and attribute information of the video to the video server 120. The operation editor may further use the management terminal 130 to upload a multimedia file of the acting role to the video server 120. The multimedia file may be an actor image, still image data of the acting role, in-play audio data of the acting role, or the like.

The video server is also connected to the network resource server 140 through a network. The network is a wireless network or a wired network.

The network resource server 140 may be a server that stores network resources, for example, a search engine server, an encyclopedia website server, or a multimedia file library server. There may be one or more network resource servers 140. FIG. 1 shows only one server as an example.

Figure 2:
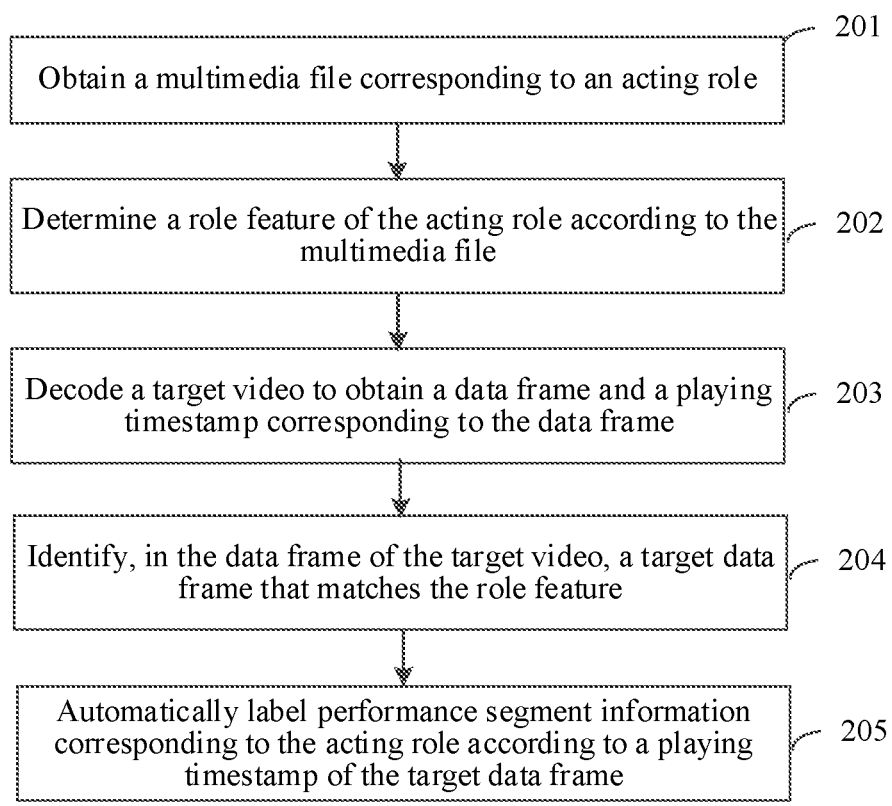
FIG. 2 is a flowchart of a method for labeling a performance segment according to an example embodiment of the disclosure.

FIG. 2 is a flowchart of a method for labeling a performance segment according to an example embodiment of the disclosure. An example embodiment is described by using an example in which the method for labeling the performance segment is applied to the video server 120 shown in FIG. 1. The method includes the following operations 201-205:

Operation 201: Obtain a multimedia file corresponding to an acting role.

The video server may receive a multimedia file of the acting role that is uploaded by the management terminal, or may obtain the multimedia file of the acting role from the network resource server.

The multimedia file includes: image data and/or audio data of the acting role.

Optionally, the multimedia file of the acting role is obtained from a source other than the target video, not from the target video itself. The same target video may correspond to multimedia files of multiple acting roles.

Optionally, the acting role is at least one of the following: a real-person acting role, an animated acting role, a mechanical acting role, a puppet acting role, and a robot acting role.

Operation 202: Determine a role feature of the acting role according to the multimedia file.

In a case that the multimedia file includes the image data of the acting role, a face feature of the acting role may be determined according to the image data of the acting role.

In a case that the multimedia file includes the audio data of the acting role, a voiceprint feature of the acting role may be determined according to the audio data of the acting role.

Operation 203: Decode a target video to obtain a data frame and a playing timestamp corresponding to the data frame.

The target video includes several data frames arranged in sequence, and each data frame corresponds to its own playing timestamp. Optionally, the data frames include: an image frame, or both an image frame and an audio frame. In a case that the data frames include only an image frame, the target video may be a silent video.

Types of the target video include but are not limited to at least one of the following: a movie, a TV series, a documentary, a variety show, an animated cartoon, a sports video, and a news video.

The terminal decodes to obtain at least one data frame in the target video. The data frame includes an image frame and an audio frame. Each data frame has its own corresponding playing timestamp.

Operation 204: Identify, in the data frame of the target video, a target data frame that matches the role feature.

The target data frame includes a target image frame and/or a target audio frame.

In a case that the role feature includes a face feature of the acting role, a target image frame that matches the face feature is identified. In a case that the role feature includes a voiceprint feature of the acting role, a target audio frame that matches the voiceprint feature is identified.

Operation 205: Automatically label performance segment information corresponding to the acting role according to a playing timestamp of the target data frame.

Optionally, the target data frames may be multiple consecutive data frames. Playing timestamps of the multiple consecutive target data frames may be combined to obtain at least one playing period. The at least one playing period is labeled as performance segment information of the acting role.

Accordingly, in the video labeling method provided in an example embodiment, the role feature of the acting role is determined according to the multimedia file of the acting role; the target data frame that matches the role feature is identified in the target video, and the performance segment information corresponding to the acting role is automatically labeled according to the playing timestamp of the target data frame, so that the server may automatically label a large number of target videos in batches. Thus, the video labeling method according to an example embodiment solves the problem in the related art that the labeling of the performance segment information has low precision and low efficiency due to an operator editor's manual labeling of videos, and increases an efficiency in labeling the performance segment information of the target videos in a limited time. In addition, because the labeling in an example this example embodiment of the disclosure uses a data frame as a granularity, the labeling precision is much higher than that of the manual labeling of the operation editor, thereby improving accuracy of labeling the performance segment information.

The role features of an acting role include at least one of a face feature or a voiceprint feature. The following descriptions describe an automatic labeling solution based on a face feature according to an example embodiment shown in FIG. 3, and describe an automatic labeling solution based on a voiceprint feature according to an example embodiment shown in FIG. 5.

Figure 3:
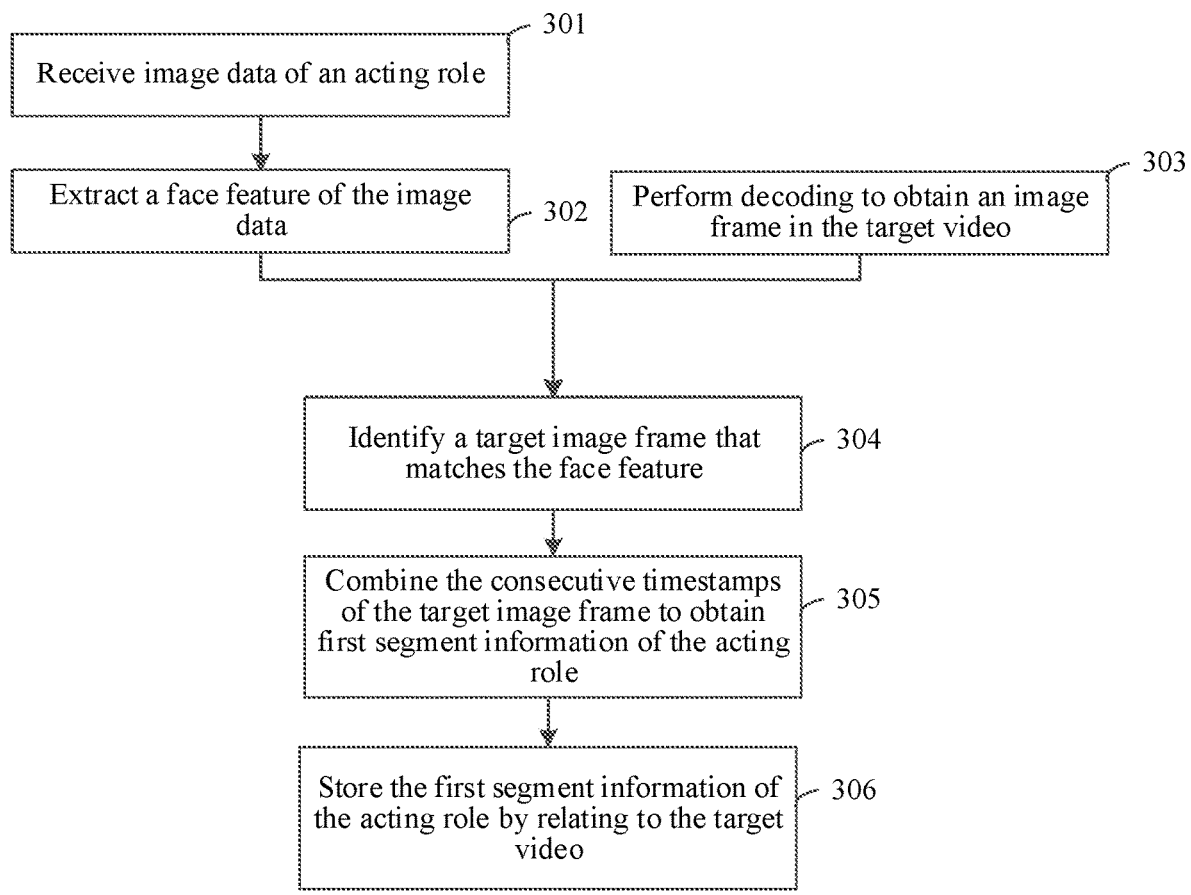
FIG. 3 is a flowchart of a method for labeling a performance segment according to an example embodiment of the disclosure.

FIG. 3 is a flowchart of a method for labeling a performance segment according to another example embodiment of the disclosure. An example embodiment is described using an example in which the method for labeling the performance segment is applied to the video server 120 shown in FIG. 1. The method includes the following operations 301-306:

Operation 301: Obtain image data of an acting role. The image data includes stills image data and/or an actor image.

Optionally, the image data of the acting role includes a face area of the acting role. The image data of the acting role may be stills image data and/or an actor image. The stills image data include stills of the acting role in a target video. The actor image includes at least one of the following: a life image of an actor, a photo shoot image, a close-up image, and a movie poster, but is not limited thereto. Generally, the actor image is not a still of the acting role in the target video.

The operation of obtaining image data of an acting role may be implemented in at least either of the following ways, I-II:

I. A video server receives the image data of the acting role that is uploaded by a management terminal.

An operator editor uploads the image data of the acting role to the video server through a management terminal.

The operator editor may upload the image data of the acting role while uploading the target video to the video server through the management terminal. Alternatively, the operation editor may upload the image data of the acting role after the video server has stored the target video.

Optionally, the image data is stills image data of the acting role in the target video. The video server obtains the stills image data of the acting role. The stills image data is stills of the acting role in the target video. Affected by makeup, costumes, subsequent beautification, and face-lifting factors of the acting role in different film and television works, the face feature of the same acting role varies between different target videos. Therefore, the operation editor uploads stills image data of the acting role in a current target video, so that a more accurate face feature may be obtained.

Figure 4:
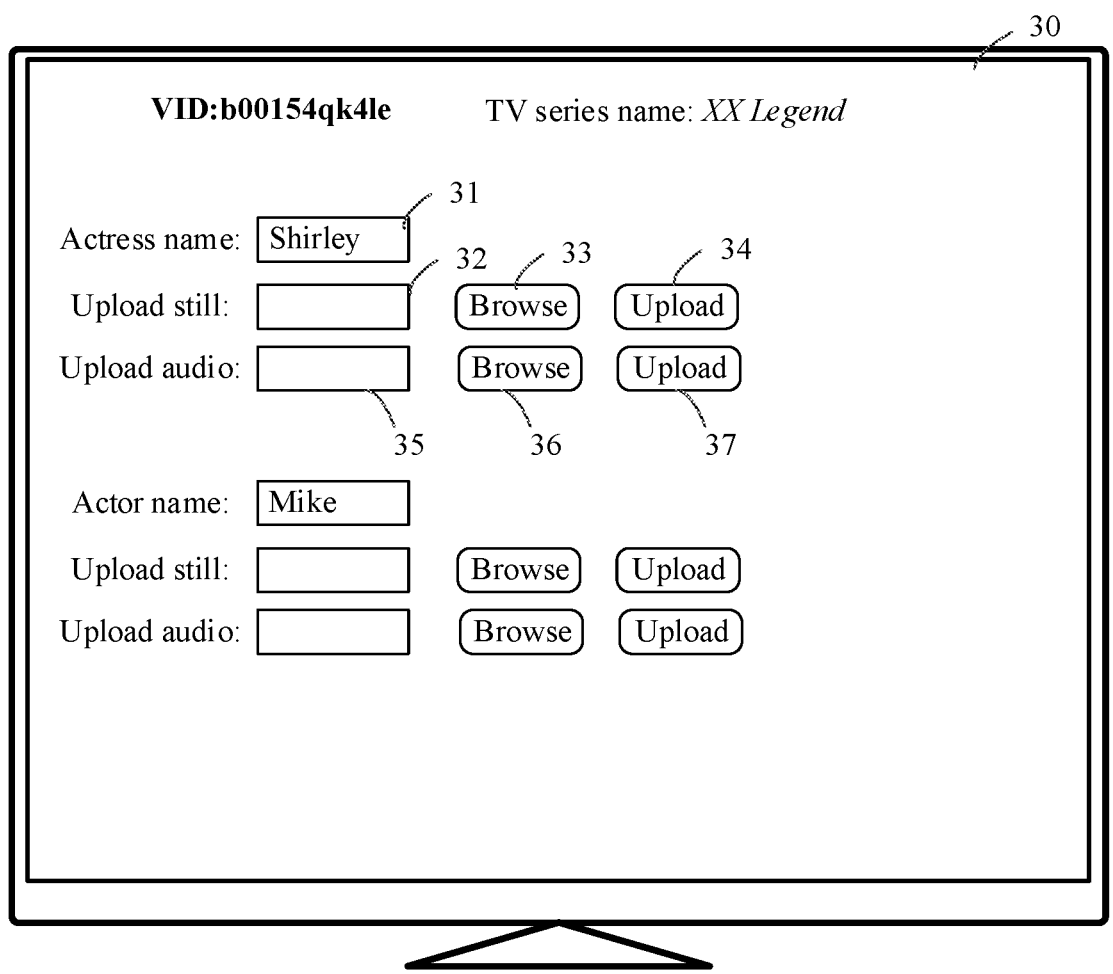
FIG. 4 is a schematic diagram of an interface for uploading a multimedia file of an acting role according to an example embodiment of the disclosure.

Referring to FIG. 4, it is assumed that an identifier of the target video is b00154qk4le, the type of the target video is a TV series, and the name of the target video is "xx Legend". The operation editor may upload image data for an acting role "Shirley" in the target video. The operation editor may input the name "Shirley" of the acting role in an acting role name input box 31, and then click a Browse button 33 corresponding to a stills upload control 32, and select stills image data of Shirley in a local file path. Then the operation editor may click an Upload button 34 corresponding to the stills upload control 32 so that the stills image data of Shirley is uploaded to the video server.

II. The video server obtains a cast list of the target video, captures, from a Character Encyclopedia page, an actor image corresponding to the actor name according to the actor name of the acting role in the cast list, and determines that the actor image is an actor image to be extracted.

The video server may receive a cast list uploaded by the operation editor for the target video. Alternatively, the video server extracts the cast list of the target video from attribute information of the target video. The cast list includes actor names corresponding to one or more acting roles. Optionally, the cast list further includes names of voice actors corresponding to one or more acting roles. Table 1 shows an example of the cast list.

TABLE 1

| TV series "Journey to the West" | | |
| --- | --- | --- |
| Role name | Name of the leading actor | Name of the voice actor |
| Tang Monk | Actor A | N/A |
| Sun Wukong | Actor B | Voice actor X |
| Sand Monk | Actor C | Voice actor Y |
| Pig Bajie | Actor D | Voice actor Z |

The video server transmits a query request to a network resource server. The query request carries an actor name corresponding to the acting role. The network resource server may be a server of the Character Encyclopedia website. The network resource server queries a corresponding Character Encyclopedia page according to the actor name. The Character Encyclopedia page includes the actor's character introduction, acting experiences, representative works introduction, related news introduction, a photo shoot image collection, a stills image collection, a poster image collection, and the like. The network resource server transmits the Character Encyclopedia page or actor images on the Character Encyclopedia page to the video server. From the actor images, the video server selects one image as the actor image to be extracted.

This example embodiment does not limit the manner in which the video server selects one of the actor images as the actor image to be extracted.

Optionally, in a case that at least two actor images exist, the video server extracts image elements in the actor images. The image elements include texts and/or items. According to the image elements, the video server determines a relevance between each actor image and the target video; and determines that an actor image of highest relevance to the target video is the actor image to be extracted.

Optionally, in a case that at least two actor images exist, the video server obtains an image shooting time corresponding to each actor image, and a video shooting time of the target video, and then determines that an actor image whose image shooting time is closest to the video shooting time of the target video is the actor image to be extracted.

Optionally, the image shooting time of the actor image may be stored in header information in an Exchangeable Image File (EXIF) format.

Optionally, the video server may filter out actor images whose image quality does not meet a preset condition. Preset conditions include but are not limited to at least one of the following: an image resolution is lower than a preset resolution, an image exposure is greater than a preset exposure, completeness of a face area does not exceed a preset percentage, and an area of the face area is less than at least a preset area.

Operation 302: Extract face feature information of the image data.

In a case that the image data includes stills image data, the video server extracts face features of the acting role from the stills image data. In a case that the image data includes actor images, the video server extracts face features of the acting role from the actor images.

The video server extracts face feature information in the image data using a face recognition technology.

The image data includes a face area of the acting role. Therefore, the video server recognizes a first face area of the acting role using a face recognition technology, and then extracts face feature information from the recognized first face area.

Face recognition technologies include but are not limited to: a method based on geometric features, a template-based method, and a model-based method. The method based on geometric features is a technology of recognizing a face based on shape features and size features of eyes, a nose, a mouth, a chin or other parts in the face. Template-based methods include a method based on relevance matching, a feature face method, a linear judgment and analysis method, a singular value decomposition method, a neural network method, and a dynamic connection matching method. Model-based methods include, for example but not limited to, at least one of the following: a method based on a hidden Markov model, a method based on an active shape model, a method based on an active appearance model, a method based on a neural network. This example embodiment does not limit the face recognition technology, as long as face feature information that meets recognition requirements may be extracted.

Illustratively, using an example in which the face recognition technology is a method based on a convolutional neural network model, the video server may extract the face feature information in the first face area through a convolutional layer in a neural network. The face feature information is used to uniquely identify the acting role.

Operation 303: Perform decoding to obtain an image frame in the target video.

The video server also decapsulates and decodes a video file or a video stream of the target video to obtain multiple image frames arranged sequentially in the target video.

Optionally, a codec exists in the video server, and may compress and decompress a video and an audio. Video data of the target video is generally encapsulated in a preset encapsulation mode such as an Audio Video Interleaved (AVI) format, a Multimedia Container (MKV) format, an RMVB format, or at least one thereof. The video server decapsulates the video data of the target video using a decoder, and then decodes the decapsulated video data to obtain multiple image frames in the target video.

Optionally, each image frame corresponds to a playing timestamp. For example, a playing timestamp of an image frame 1 is 00:03:12, denoting that the image frame 1 is an image frame played at 00:03:12 after the start of playing the target video.

Operation 304: Identify an image frame that matches the face feature.

The video server regards all or part of the image frames in the target video as image frames to be recognized. For example, the video server uses a key frame in the target video as an image frame to be recognized. Generally, image frames include three frame types: an I frame, a P frame, and a B frame. An I frame is a frame that may be displayed independently (or self-described), and a P frame and a B frame are frames that are displayable depending on an adjacent I frame.

Optionally, the video server recognizes a second face area in the image frame of the target video, extracts a candidate face feature in the recognized second face area, and calculates a similarity between the face feature of the acting role and the candidate face feature. In a case that the similarity exceeds a preset threshold, it is determined that the image frame is the target image frame matching the face feature of the acting role.

Optionally, multiple target image frames match the face feature of the acting role, and there are at least two target image frames whose playing timestamps are consecutive. Regarding the meaning of the term "consecutive", two playing timestamps are considered consecutive in a case that no other playing timestamps exist between the two playing timestamps. For example, in a case that playing timestamps between two adjacent image frames are 1/24 second apart, a time difference between the two playing timestamps is 1/24 second, and the two playing timestamps are considered consecutive.

Operation 305: Combine the consecutive timestamps of the target image frame to obtain first segment information of the acting role.

Generally, a performance picture of an acting role (e.g., a picture of an acting role performing) appears in multiple periods throughout a video. The video server combines the consecutive timestamps of the target image frame that matches the face feature, so as to obtain the first segment information of the acting role. The first segment information may be considered as performance segment information of the acting role in a visual dimension. The first segment information includes one or more performance segments.

Optionally, in a case that a set of consecutive timestamps exists, an earliest timestamp and a latest timestamp in the set of consecutive timestamps are used to denote a segment in the first segment information. The first segment information may include at least one segment. For example, first segment information of an acting role A includes: [00:30:12, 00:31:56], [00:33:00, 00:38:56], and [01:13:00, 01:15:56], where [00:30:12, 00:31:56] is a segment, 00:30:12 is a start timestamp of the segment, and 00:31:56 is an end timestamp of the segment.

Operation 306: Store the first segment information of the acting role in association with the target video.

The video server also stores the first segment information of the acting role as attribute information of the target video in association with each other. Table 2 shows an example of pieces of the first segment information as the performance segment information stored in association with target videos.

TABLE 2

| Video ID | Video name | Name of acting role | Performance segment information |
|---|---|---|---|
| b00154qk4le | xx Legend_01 | Shirley | First performance segment 1 |
| b00154qk4le | xx Legend_01 | Mike | First performance segment 2 |
| b00154qk4le | xx Legend_02 | Shirley | First performance segment 3 |
| b00154qk4le | xx Legend_02 | Mike | First performance segment 4 |
| b00154qk4le | xx Legend_03 | Shirley | First performance segment 5 |

Accordingly, in the method for labeling a performance segment according to this example embodiment, the role feature of the acting role is determined according to the multimedia file of the acting role; the target data frame that matches the role feature is identified in the target video, and the performance segment information corresponding to the acting role is automatically labeled according to the playing timestamp of the target data frame, so that the server may automatically label a large number of target videos in batches. This solves the problem of low precision and low efficiency in an operator editor's manual labeling of videos in the related art, and achieves an effect of efficiently labeling the performance segment information of the target videos in a limited time. In addition, because the labeling in this example embodiment of the disclosure uses a data frame as a granularity, the labeling precision is much higher than that of the manual labeling of the operation editor, thereby improving accuracy of labeling the performance segment information.

In the method for labeling a performance segment according to this example embodiment, the stills image data of the acting role is used as footage from which the face feature of the acting role is extracted. This minimizes impact caused by makeup, costumes, subsequent beautification, and face-lifting of the acting role in different film and television works, improves accuracy of identifying, in the target video, the image frame that matches the face feature, and improves matching efficiency of the video server.

In the method for labeling a performance segment according to this example embodiment, the video server may also use a web server to collect actor images of the acting role on a Character Encyclopedia page, and use the actor images as the image data of the acting role. Without requiring the operation editor to perform manual uploading, the method for labeling a performance segment according to an example embodiment improves intelligence and efficiency for the video server to label the performance segment.

Figure 5:
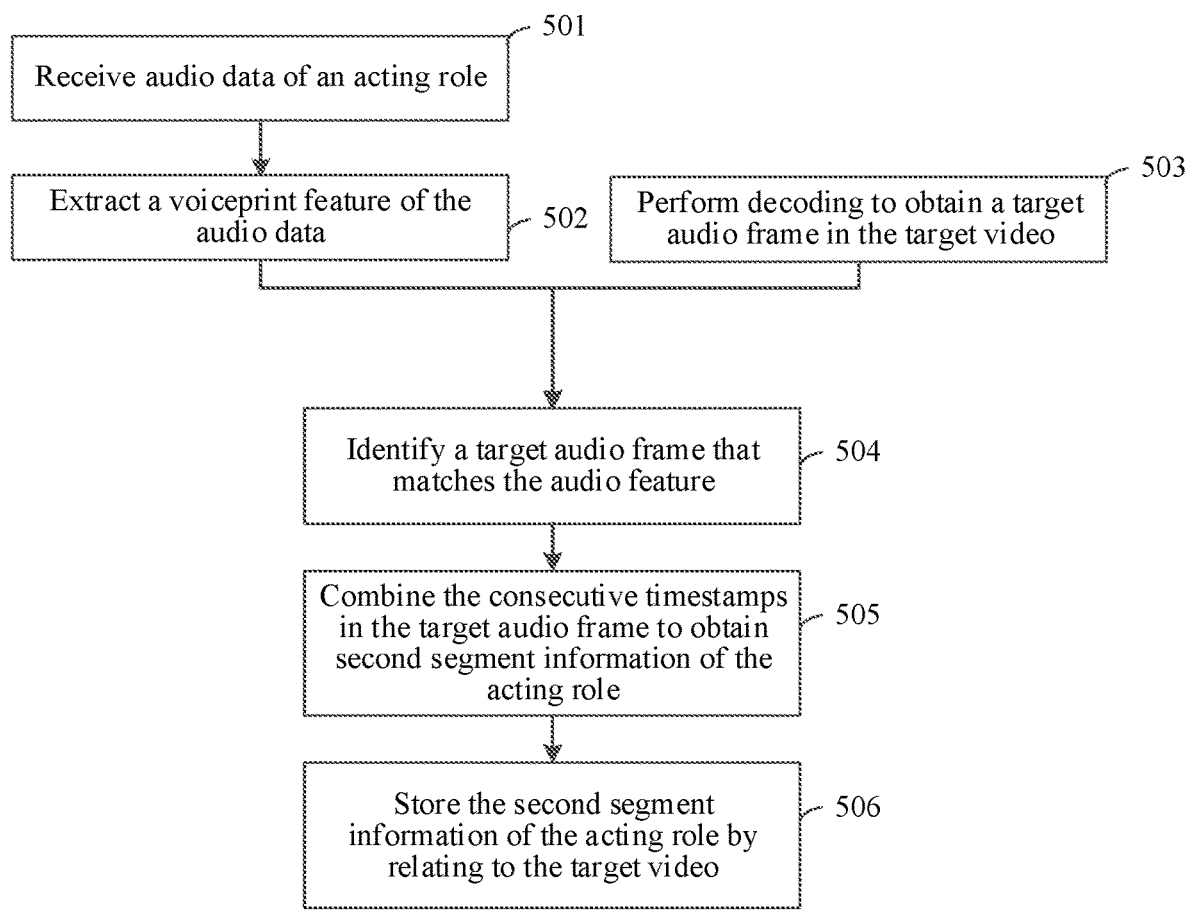
FIG. 5 is a flowchart of a method for labeling a performance segment according to an example embodiment of the disclosure.

FIG. 5 is a flowchart of a method for labeling a performance segment according to another example embodiment of the disclosure. This example embodiment is described using an example in which the method for labeling the performance segment is applied to the video server 120 shown in FIG. 1. The method includes the following operations 501-506:

Operation 501: Obtain audio data of an acting role. The audio data includes in-play audio data and/or actor audio data.

Optionally, the audio data of the acting role includes the in-play audio data and/or the actor audio data. The in-play audio data is the corresponding audio data of the acting role in a target video, and the actor audio data is the corresponding actor audio data corresponding to the acting role in actual life or other videos.

The in-play audio data includes: audio data of a leading actor, and/or audio data for dubbing the acting role. A voice actor may be different from the leading actor.

The operation of obtaining audio data of an acting role may be implemented in at least one of the following three ways, I-III:

I. A video server receives the audio data of the acting role that is uploaded by a management terminal.

An operation editor uploads the audio data of the acting role to the video server through the management terminal. The video server may receive the audio data of the acting role that is uploaded by the management terminal.

The operator editor may upload the audio data of the acting role while uploading the target video to the video server through the management terminal. Alternatively, the operation editor may upload the audio data of the acting role after the video server has stored the target video.

Optionally, the audio data is in-play audio data of the acting role in the target video. Due to a possible practice that the acting role uses his/her own voice or voices of different dubbing acting roles in different films and television works, the audio feature of the same acting role may vary between different target videos. Therefore, the operation editor uploads in-play audio data of the acting role in a current target video, so that a more accurate audio feature may be obtained.

Referring to FIG. 4, it is assumed that an identifier of the target video is b00154qk4le, the type of the target video is a TV series, and the name of the target video is "xx Legend". The operation editor may upload audio data for an acting role "Shirley" in the target video. The operation editor may input the name "Shirley" of the acting role in an acting role name input box 31, and then click a Browse button 36 corresponding to an audio upload control 35, and select in-play audio data of Shirley in a local file path. Then the operation editor may click an Upload button 37 corresponding to the stills upload control 35 so that the in-play audio data of Shirley is uploaded to the video server.

II. The video server obtains a cast list of the target video. In a case that existence of a name of a voice actor of the acting role is determined according to the cast list, actor audio data is captured from a network resource according to the name of the voice actor.

The video server may receive a cast list uploaded by the operation editor for the target video; or, the video server extracts a cast list of the target video from attribute information of the target video; or, the video server obtains a cast list of the target video from a network resource server. The cast list includes actor names corresponding to one or more acting roles. Optionally, the cast list further includes names of voice actors corresponding to one or more acting roles. Table 1 described above in the example embodiment of FIG. 3 shows an example of the cast list.

For an acting role, in a case that the video server determines, according to the cast list, that a name of a voice actor corresponding to the acting role exists, the video server captures actor audio data of the voice actor from a network resource according to the name of the voice actor. Optionally, the video server transmits a first audio query request to a network resource server. The first audio query request carries the name of the voice actor. In locally stored network resources, the network resource server searches for the actor audio data corresponding to the name of the voice actor, and returns the found actor audio data to the video server.

III. The video server obtains a cast list of the target video. In a case that it is determined that a name of a voice actor of the acting role does not exist according to the cast list, actor audio data is captured from a network resource according to the name of the leading actor.

For an acting role, in a case that the video server determines, according to the cast list, that no name of a voice actor corresponding to the acting role exists, the video server captures actor audio data of the leading actor from the network resource according to the name of the leading actor. Optionally, the video server transmits a second audio query request to the network resource server. The second audio query request carries the name of the leading actor. In locally stored network resources, the network resource server searches for the actor audio data corresponding to the name of the leading actor, and returns the found actor audio data to the video server.

Operation 502: Extract an audio feature of the acting role from the audio data.

The video server may extract a voiceprint feature of the audio data from the audio data using an audio recognition technology. The audio feature of the acting role includes in-play audio data and/or actor audio data.

In a case that the audio data includes in-play audio data, the voiceprint feature of the acting role is extracted from the in-play audio data. In a case that the audio data includes actor audio data, the voiceprint feature of the acting role is extracted from the actor audio data. The voiceprint feature may be identified by at least one of the following features: a spectrum, a cepstral coefficient, a formant, a pitch, and a reflection system.

Audio recognition technologies include but are not limited to: a method based on template matching, a method based on a nearest neighbor, a method based on a neural network, a method based on a hidden Markov model, a method based on a polynomial classifier, and a method based on a neural network model. This example embodiment does not limit the audio recognition technology, as long as audio feature information that meets recognition requirements may be extracted.

Operation 503: Perform decoding to obtain an audio frame in the target video.

The video server also decapsulates and decodes a video file or a video stream of the target video to obtain multiple audio frames in the target video.

Optionally, a codec exists in the video server, and may compress and decompress a video and an audio. Video data of the target video is generally encapsulated in a preset encapsulation mode such as an AVI format, an MKV format, an RMVB format, or at least one thereof. The video server decapsulates the video data of the target video using a decoder, and then decodes the decapsulated video data to obtain multiple audio frames in the target video.

Optionally, each audio frame corresponds to a playing timestamp. For example, a playing timestamp of an audio frame 1 is 00:03:12, denoting that the audio frame 1 is an audio frame played at 00:03:12 after the start of playing the target video.

Operation 504: Identify a target audio frame that matches the voiceprint feature.

Using a voiceprint recognition (also referred to as speaker identification) technology, the video server recognizes an audio frame that matches the audio feature information.

Optionally, the video server first classifies audio frames of the same speaker using a speaker diarization technology; then, matches the voiceprint feature in each type of audio frame with the voiceprint feature information of the acting role one by one using a speaker identification technology, thereby identifying the target audio frame that matches the voiceprint feature of the acting role.

Operation 505: Combine the consecutive timestamps in the target audio frame to obtain second segment information of the acting role.

Generally, audio data of one acting role during speaking appears in multiple periods throughout a video. The video server combines the consecutive timestamps of the audio frame that matches the audio feature information, so as to obtain the second segment information of the acting role. The second segment information may be considered as performance segment information of the acting role in an auditory dimension.

Optionally, in a case that a set of consecutive timestamps exists, an earliest timestamp and a latest timestamp in the set of consecutive timestamps are used to denote a segment in the second segment information. The second segment information may include at least one segment. For example, second segment information of an acting role A includes: [00:30:12, 12:31:58], [12:32:40, 00:38:56], and [01:13:00, 01:15:56], where [00:30:12, 12:31:58] is a segment, 00:30: 12 is a start timestamp of the segment, and 12:31:58 is an end timestamp of the segment.

Operation 506: Store the second segment information of the acting role in association with the target video.

The video server also stores the second segment information of the acting role as attribute information of the target video in association with each other. Table 3 shows an example of pieces of the second segment information as the performance segment information stored in association with target videos.

TABLE 3

| Video ID | Video name | Name of acting role | Performance segment information |
|---|---|---|---|
| b00154qk4le | xx Legend_01 | Shirley | Second performance segment 1 |
| b00154qk4le | xx Legend_01 | Mike | Second performance segment 2 |
| b00154qk4le | xx Legend_02 | Shirley | Second performance segment 3 |
| b00154qk4le | xx Legend_02 | Mike | Second performance segment 4 |
| b00154qk4le | xx Legend_03 | Shirley | Second performance segment 5 |

Accordingly, in the method for labeling a performance segment according to this example embodiment, the role feature of the acting role is determined according to the multimedia file of the acting role; the target data frame that matches the role feature is identified in the target video, and the performance segment information corresponding to the acting role is automatically labeled according to the playing timestamp of the target data frame, so that the server may automatically label a large number of target videos in batches. This solves the problem of low precision and low efficiency in an operator editor's manual labeling of videos in the related art, and achieves an effect of efficiently labeling the performance segment information of the target videos in a limited time (such as an on-show period of a new TV series). In addition, because the labeling in this example embodiment of the disclosure uses a data frame as a granularity, the labeling precision is much higher than that of the manual labeling of the operation editor, thereby improving accuracy of labeling the performance segment information.

In the method for labeling a performance segment according to this example embodiment, the in-play audio information of the acting role is used as footage from which the voiceprint feature of the acting role is extracted. This minimizes impact caused by a possible practice of applying different voice actors to the acting role in different film and television works, improves accuracy of identifying, in the target video, the target audio frame that matches the voiceprint feature, and improves matching efficiency of the video server.

Figure 6:
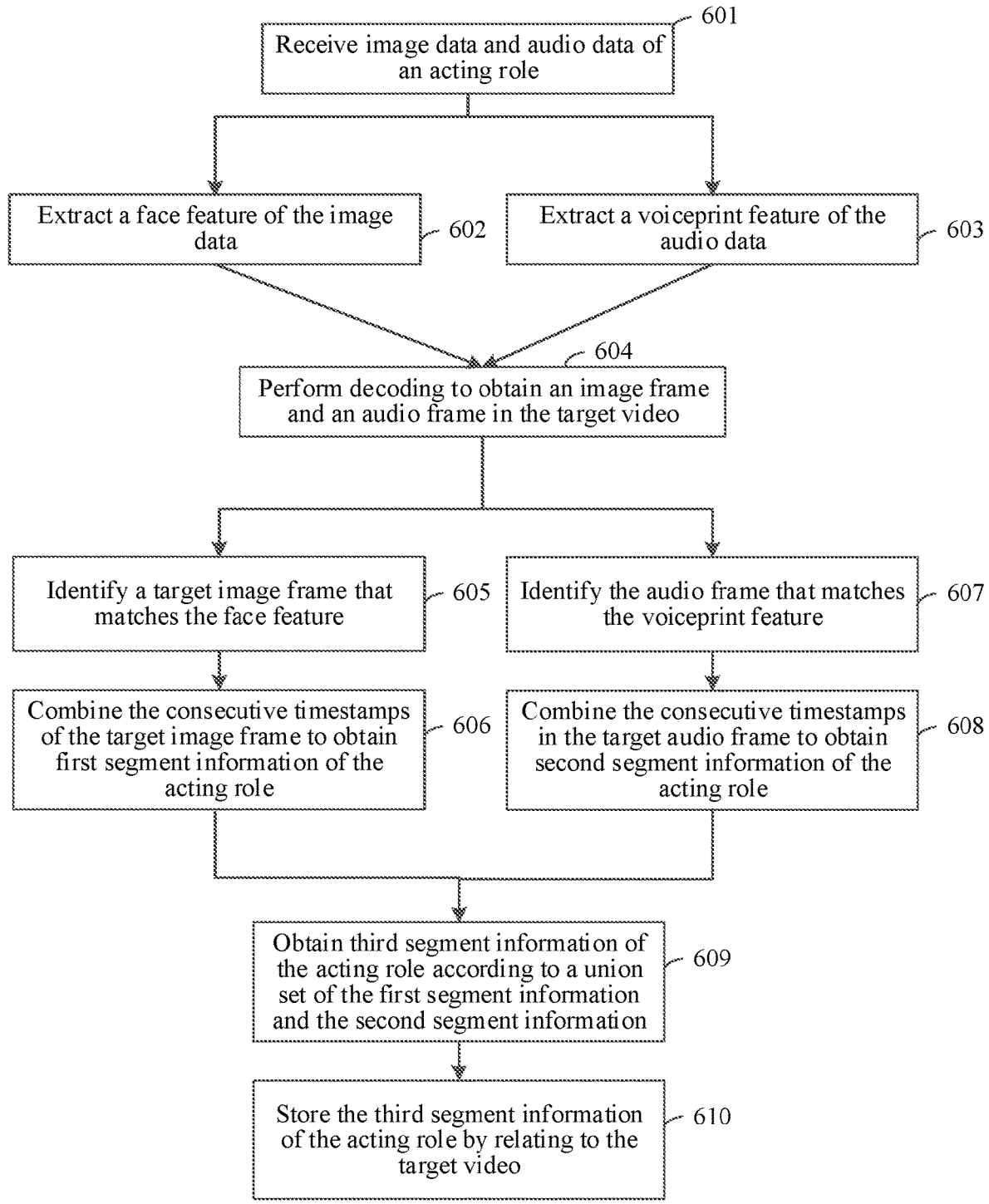
FIG. 6 is a flowchart of a method for labeling a performance segment according to an example embodiment of the disclosure.

FIG. 6 is a flowchart of a method for labeling a performance segment according to another example embodiment of the disclosure. This example embodiment is described using an example in which the method for labeling the performance segment is applied to the video server 120 shown in FIG. 1. The method includes the following operations 601-610:

Operation 601: Obtain image data and audio data corresponding to an acting role.

Optionally, the image data of the acting role includes a face area of the acting role. The image data of the acting role may include stills image data and/or an actor image.

Optionally, the audio data of the acting role includes the in-play audio data and/or the actor audio data. The in-play audio data is the corresponding audio data of the acting role in a target video, and the actor audio data is the corresponding actor audio data corresponding to the acting role in actual life or other videos.

The in-play audio data includes: audio data of a leading actor, and/or audio data for dubbing the acting role. A voice actor may be different from the leading actor.

Optionally, an operator editor uploads the image data and audio data of the acting role to the video server through a management terminal. The image data may be stills image data of the acting role, and the audio data may be in-play audio data of the acting role.

Referring to FIG. 4, it is assumed that an identifier of the target video is b00154qk4le, the type of the target video is a TV series, and the name of the target video is "xx Legend". The operation editor may upload image data for an acting role "Shirley" in the target video. The operation editor may input the name "Shirley" of the acting role in an acting role name input box 31, and then click a Browse button 33 corresponding to a stills upload control 32, and select stills image data of Shirley in a local file path. Then the operation editor may click an Upload button 34 corresponding to the stills upload control 32 so that the stills image data of Shirley is uploaded to the video server. Subsequently, the operation editor may click a Browse button 36 corresponding to the audio upload control 35, and select in-play audio data of Shirley in a local file path, and then click an Upload button 37 corresponding to the stills upload control 35 so that the in-play audio data of Shirley is uploaded to the video server.

Optionally, the video server obtains a multimedia file of the acting role in the method described in the example embodiment(s) shown in FIG. 3 and/or FIG. 5.

Operation 602: Extract a face feature of the image data.

The video server extracts the face feature in the image data using a face recognition technology. The image data of the acting role may include stills image data and/or an actor image. This example embodiment uses an example in which the image data includes stills image data.

The image data includes a face area of the acting role. Therefore, the video server recognizes a first face area of the acting role using a face recognition technology, and then extracts the face feature from the recognized first face area.

Operation 603: Extract a voiceprint feature of the audio data.

The video server may extract a voiceprint feature of the acting role from the audio data using an audio recognition technology. The audio data of the acting role includes the in-play audio data and/or the actor audio data. This example embodiment uses an example in which the image data includes in-play audio data.

Operation 604: Perform decoding to obtain an image frame and an audio frame in the target video.

The video server also decapsulates and decodes a video file or a video stream of the target video to obtain multiple image frames and audio frames in the target video.

Optionally, a codec exists in the video server, and may compress and decompress a video and an audio. Video data of the target video is generally encapsulated in a preset encapsulation mode such as an AVI format, an MKV format, an RMVB format, or at least one thereof. The video server decapsulates the video data of the target video using a decoder, and then decodes the decapsulated video data to obtain multiple image frames and audio frames in the target video.

Optionally, each image frame has a corresponding playing timestamp, and each audio frame has a corresponding playing timestamp.

Operation 605: Identify a target image frame that matches the face feature of the acting role.

Optionally, the video server recognizes a second face area in the target image frame of the target video, extracts a candidate face feature in the recognized second face area, and calculates a similarity between the face feature of the acting role and the candidate face feature. In a case that the similarity exceeds a preset threshold, it is determined that the target image frame is the target image frame matching the face feature of the acting role.

Operation 606: Combine the consecutive timestamps of the target image frame to obtain first segment information of the acting role.

The video server combines the consecutive timestamps of the target image frame to obtain the first segment information of the acting role. The first segment information may be considered as performance segment information of the acting role in a visual dimension. The first segment information includes one or more performance segments.

Operation 607: Identify a target audio frame that matches the voiceprint feature of the acting role.

Using a voiceprint recognition (also referred to as speaker identification) technology, the video server recognizes a target audio frame that matches the voiceprint feature.

Operation 608: Combine the consecutive timestamps in the target audio frame to obtain second segment information of the acting role.

The video server combines the consecutive timestamps of the target audio frame to obtain the second segment information of the acting role. The second segment information may be considered as performance segment information of the acting role in an auditory dimension. The second segment information includes one or more performance segments.

Operation 609: Obtain third segment information of the acting role based on a combination (or a union set) of the first segment information and the second segment information.

For the same acting role, the acting role may show up in a video picture without speaking, or the acting role may be speaking without showing up in the video picture. Both of such cases may be considered as performance periods of the acting role.

Therefore, the video server combines segments of the first segment information and segments of the second segment information to obtain third segment information of the acting role. For example:

First segment information of an acting role A includes: [00:30:12, 00:31:56], [00:33:00, 00:38:56], and [01:13:00, 01:15:56].

Second segment information of the acting role A includes: [00:30:12, 00:31:58], [00:32:40, 00:38:56], and [01:13:00, 01:15:56].

Therefore, the first segment information and the second segment information are combined to obtain third segment information including: [00:30:12, 00:31:58], [00:32:40, 00:38:56], and [01:13:00, 01:15:56].

Operation 610: Store the third segment information of the acting role in association the target video.

The video server also stores the third segment information of the acting role as attribute information of the target video in association with each other. Table 4 shows an example of pieces of the third segment information as the performance segment information stored in association with target videos.

TABLE 4

| Video ID | Video name | Name of acting role | Performance segment information |
|---|---|---|---|
| b00154qk4le | xx Legend_01 | Shirley | Third performance segment 1 |
| b00154qk4le | xx Legend_01 | Mike | Third performance segment 2 |
| b00154qk4le | xx Legend_02 | Shirley | Third performance segment 3 |
| b00154qk4le | xx Legend_02 | Mike | Third performance segment 4 |
| b00154qk4le | xx Legend_03 | Shirley | Third performance segment 5 |

This example embodiment does not limit the implementation order between operation 602 and operation 603. Operation 602 may be implemented before operation 603, or after operation 603, or the two operations may be implemented in parallel.

This example embodiment does not limit the implementation order between operations 605-606 and operations 607-608. Operations 605-606 may be implemented before operations 607-608, or after operation 607-608, or the two sets of operations may be implemented in parallel.

The combination process in operation 609 is an optional operation. The server may also directly store the first segment information and the second segment information of the acting role without combining.

Accordingly, in the method for labeling a performance segment according to this example embodiment, the performance segment of the acting role in the target video is labeled according to the image data and the audio data of the acting role, so that an actual performance segment of the acting role in the target video may be labeled more accurately, and accuracy and efficiency of labeling of the performance segment are improved.

Technical details in the example embodiment shown in FIG. 6 may be obtained with reference to the content disclosed in the example embodiments shown in FIG. 3 and FIG. 5, and descriptions thereof are omitted here.

Figure 7:
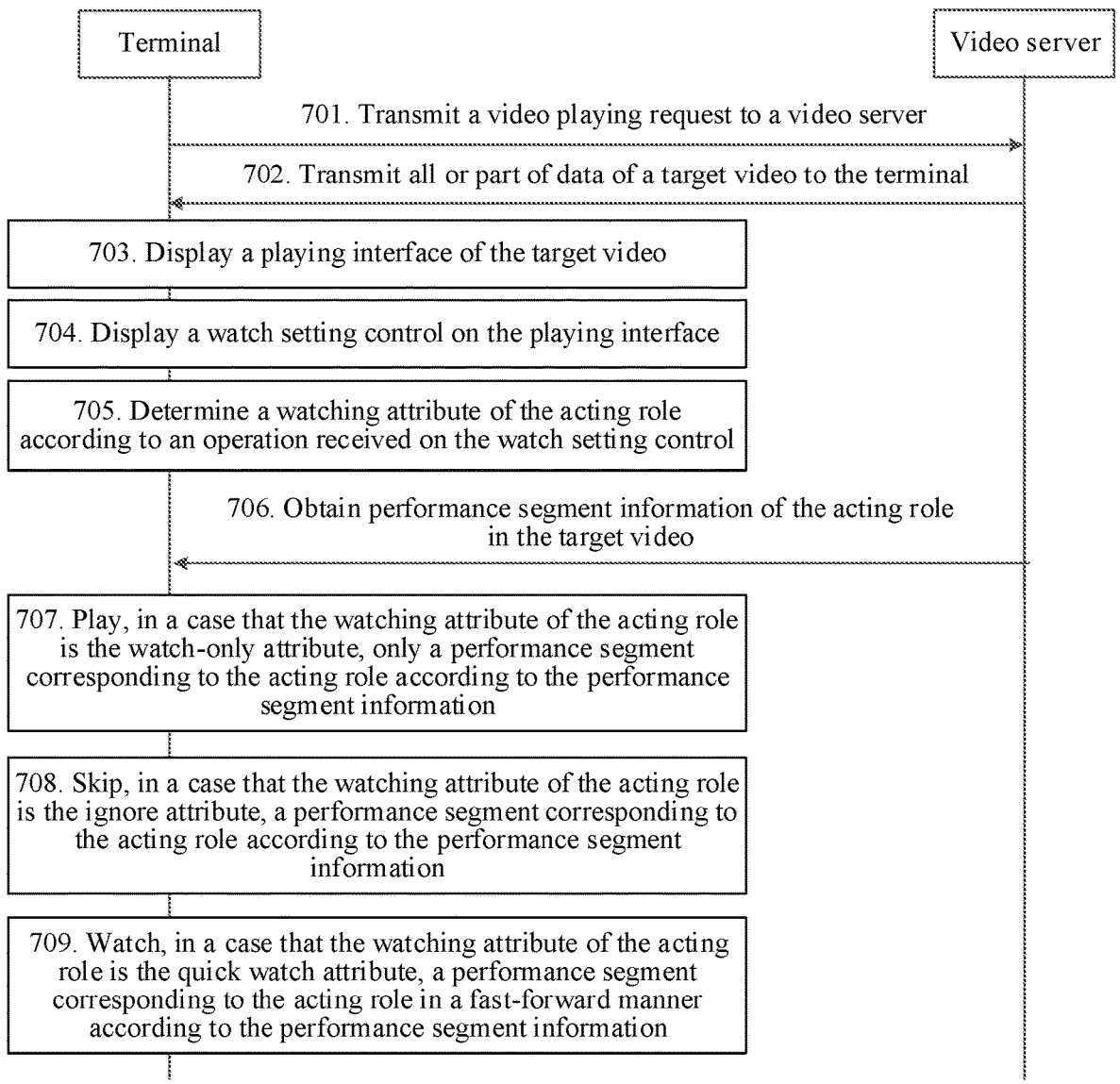
FIG. 7 is a flowchart of a video playing method according to an example embodiment of the disclosure.

FIG. 7 is a flowchart of a video playing method according to an example embodiment of the disclosure. This example embodiment uses an example in which the method is applied to a terminal 110 shown in FIG. 1. The method includes the following operations 701-709:

Operation 701: A terminal transmits a video playing request to a video server. The video playing request carries a video identifier of a target video.

A front-end program runs in the terminal. The front-end program may be at least one of the following: a webpage, an online video playing APP, an offline video playing APP, a short video playing APP, and a news APP. The front-end program may also be briefly known as a video APP.

Using an example in which a video APP runs in the terminal, when a user wants to watch a target video, the video APP transmits a video playing request to the video server. The video playing request carries a video identifier of the target video.

For example, the video identifier of the target video is b00154qk4le.

Operation 702: The video server transmits all or part of data of the target video to the terminal.

A back-end program runs in the video server. The back-end program means a remote service and an interface that are deployed in the video server.

Optionally, in a case that the terminal plays the target video by buffering the video offline, the video server may transmit all video data of the target video to the terminal.

Optionally, in a case that the terminal plays the target video by loading the video online in real time, the video server may transmit all or part of video streams in the target video to the terminal. For example, in an initial stage, the video server transmits the first n seconds of a video stream of the target video to the terminal.

In an optional embodiment, the video server may also transmit performance segment information of at least one acting role corresponding to the target video along with video data of the target video to the terminal simultaneously. Correspondingly, the terminal receives the video data of the target video, and obtains the performance segment information of at least one acting role in the target video.

Operation 703: The terminal displays a playing interface of the target video.

The front-end program installed in the terminal displays the playing interface of the target video according to all or part of the video data of the target video. Optionally, the playing interface displays playing controls such as a play button, a fast forward button, a rewind button, and a playing progress bar.

Figure 8:
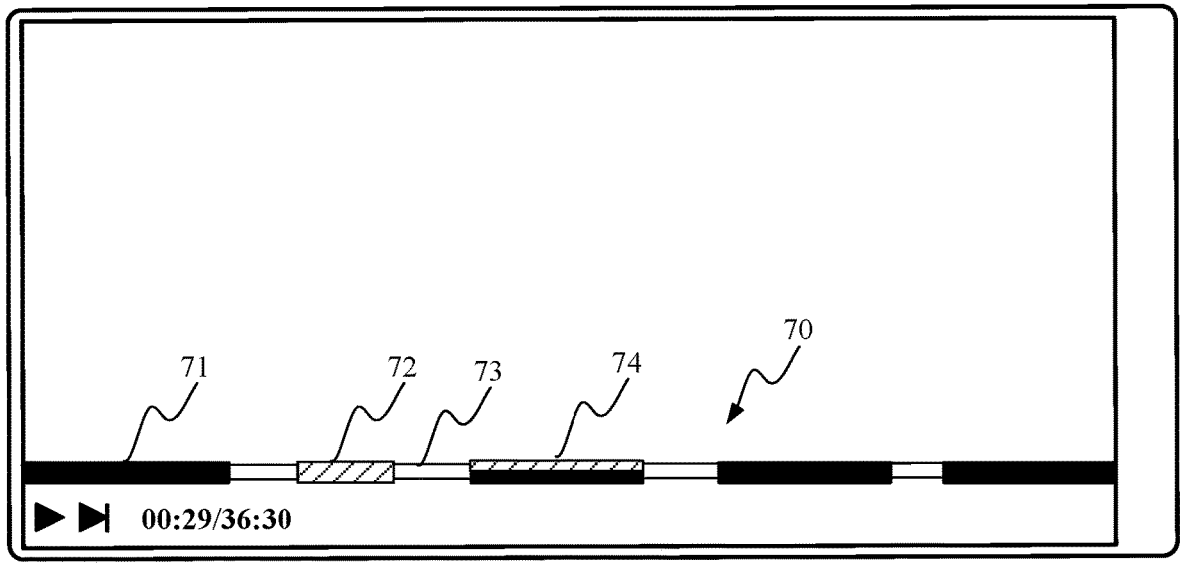
FIG. 8 is a schematic diagram of an interface of a watch setting control according to an example embodiment of the disclosure.

Optionally, the playing progress bar is displayed on the playing interface. At least one performance interval is displayed on the playing progress bar, and each performance interval corresponds to an acting role respectively. Referring to FIG. 8, a playing progress bar 70 is displayed on the playing interface. The playing progress bar 70 displays performance intervals denoted by three different filler patterns. A performance interval corresponding to a black filler pattern 71 corresponds to an acting role A, a performance interval corresponding to a striped filler pattern 72 corresponds to an acting role B, and a performance interval corresponding to a white filler pattern 73 corresponds to another acting role (or a transition picture in which no acting role exists). When the acting role A and the acting role B show up on the same picture at the same time, a stack pattern 74 of two filler patterns may be used to denote the performance interval.

Operation 704: The terminal displays a watch setting control of at least one acting role on the playing interface.

The watch setting control is used to set a watching attribute of the acting role. The watching attribute includes at least one of the following attributes: a watch-only attribute, an ignore attribute, and a quick watch attribute. Each acting role has a corresponding role identifier in the terminal and the server.

The watch-only attribute refers to playing a performance segment of the acting role but not playing performance segments of other acting roles. The ignore attribute refers to not playing the performance segment of the acting role but playing a performance segment of another acting role. The fast watch attribute refers to playing the performance segment of the acting role in a fast-forward manner but not playing performance segments of other acting roles.

Optionally, the watching attribute further includes a normal playing attribute. The normal playing attribute is a watching attribute for playing performance segments of all acting roles by default.

Optionally, the watch setting control may also display a total duration of a performance segment corresponding to each acting role.

In an optional embodiment, the watch setting control of the acting role is displayed in a preset area on the playing interface. The preset area includes an upper area, a left area, a lower area, or a right area of a playing window of the target video.

Figure 9:
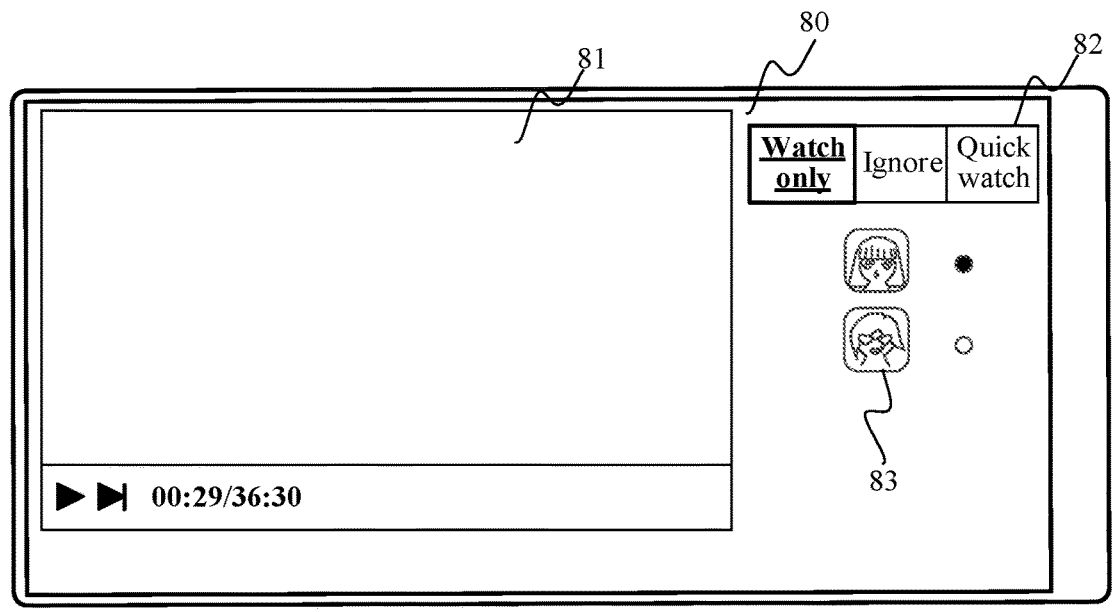
FIG. 9 is a schematic diagram of an interface of a video playing method according to an example embodiment of the disclosure.

For example, as shown in FIG. 9, a playing window 81 is displayed on the left half of the playing interface 80 displayed on the terminal. The watch setting control is displayed in a right area of the playing window 81. The watch setting control includes a watching attribute selection control 82 and an acting role selection control 83. The watching attribute selection control 82 is used to set the watching attribute to a watch-only attribute, or an ignore attribute, or a quick watch attribute. The acting role selection control 83 is used to set a corresponding acting role under each watching attribute. For example, an acting role having a watch-only attribute is the first of two acting roles arranged vertically.

The disclosure does not limit a specific form or number of watch setting controls, as long as the watch setting controls implement the function of setting the watching attribute of one or more acting roles.

Operation 705: The terminal determines a watching attribute of the acting role according to an operation received on the watch setting control.

When the user operates on the watch setting control, the user may set the watching attribute for the acting role on the watch setting control. The watching attribute includes at least one of the following attributes: a watch-only attribute, an ignore attribute, and quick watch attribute.

Operation 706: The terminal obtains performance segment information of the acting role in the target video.

In an optional embodiment, the terminal obtains the performance segment information of the acting role in the target video while receiving all or part of data of the target video. For example, after the terminal transmits the video identifier of the target video to a server, the server transmits performance segment information of at least one acting role in the target video to the terminal according to the video identifier, and the terminal receives the performance segment information of the at least one acting role transmitted by the server. In this case, operation 706 and operations 701-702 may be performed in parallel.

In an optional embodiment, after the terminal determines, in operation 705, the watching attribute of the acting role selected among n acting roles, and after the terminal transmits the video identifier of the target video to the server, the server transmits the performance segment information of at least one acting role in the target video to the terminal according to the video identifier, and the terminal receives the performance segment information of the at least one acting role transmitted by the server. The performance segment information is pre-labeled by the server, or the server labels the performance segment information after receiving the video identifier that is of the target video and that is transmitted by the terminal.

In another optional embodiment, after determining the watching attribute of the acting role selected among n acting roles in operation 705, the terminal transmits the role identifier of the selected acting role to the server. The server transmits the performance segment information of the selected acting role to the terminal according to the role identifier of the selected acting role, and the terminal receives the performance segment information of the selected acting role transmitted by the server. The performance segment information is pre-labeled by the server, or the server labels the performance segment information after receiving the role identifier that is of the selected acting role and that is transmitted by the terminal.

Optionally, the performance segment information is automatically labeled according to a role feature of the acting role, and the role feature is determined according to a multimedia file corresponding to the acting role. Optionally, the performance segment information is pre-labeled by the server beforehand, or the server labels the performance segment information before the terminal transmits the identifier that is used to obtain the performance segment information. This example embodiment of the disclosure does not limit the specific implementation time or implementation manner of operation 706.

Optionally, the performance segment information of the acting role may be obtained with reference to Table 1, Table 2, Table 3, and/or Table 4 described above. The performance segment information is automatically labeled by the video server according to the multimedia file of the acting role. The multimedia file of the acting role includes image data of the acting role and/or audio data of the acting role.

The process of the server automatically labeling the performance segment information according to the image data of the acting role may be obtained with reference to the example embodiment shown in FIG. 3. The process of the server automatically labeling the performance segment information according to the audio data of the acting role may be obtained with reference to the example embodiment shown in FIG. 5. The process of the server automatically labeling the performance segment information according to the image data and the audio data of the acting role may be obtained with reference to the example embodiment shown in FIG. 6.

Operation 707: Play, in a case that the watching attribute of the acting role is the watch-only attribute, only a performance segment corresponding to the acting role according to the performance segment information.

Optionally, in a case that the watching attribute of the acting role is the watch-only attribute, the terminal obtains the performance segment information of the acting role. The performance segment information includes one or more performance segments. Each performance segment of the acting role A starts being played from a start time of an $i^{th}$ performance segment. At an end time of the $i^{th}$ performance segment, the performance segment stops being played or jumps to a start time of an $(i+1)^{th}$ performance segment to continue being played, where i is a positive integer. In a case that watching attributes of other acting roles are a default normal play attribute, other performance segments different from those of the acting role A in the target video will not be played any longer.

Optionally, the terminal displays, according to the performance segment information, the performance segment corresponding to the acting role on the playing progress bar of the playing interface in a first distinct display manner. The first distinct display manner may include, for example but not limited to, at least one of the following manners: increasing display brightness, displaying in a first color belonging to a vivid color series, displaying with a first filler pattern, and displaying in boldface. For example, the performance segment corresponding to the acting role may be displayed in blue on the playing progress bar, and other areas may be displayed in gray on the playing progress bar.

Figure 10:
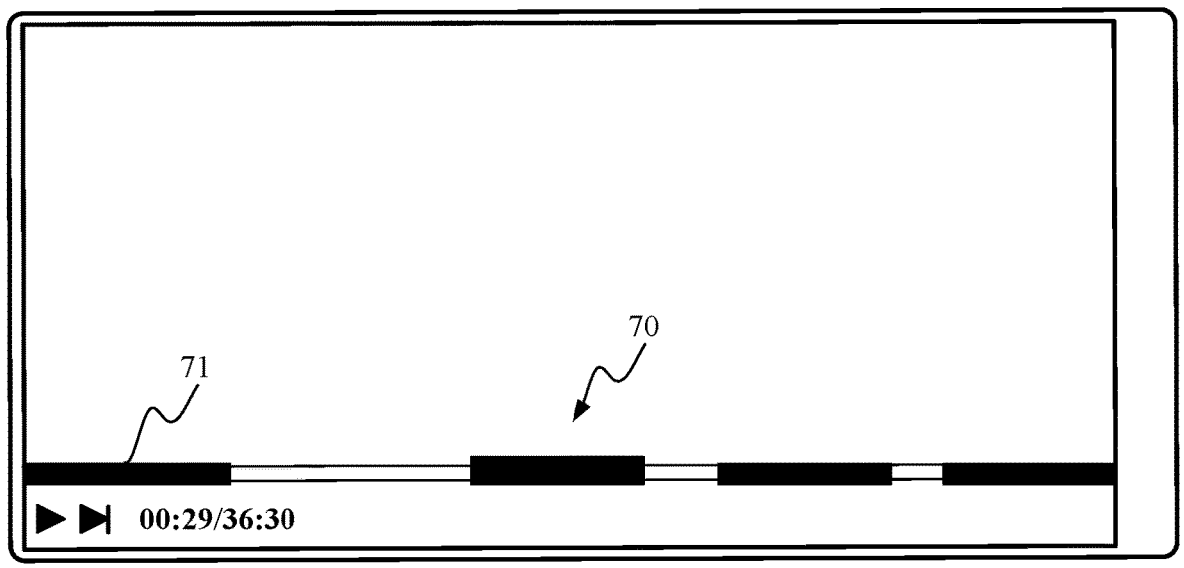
FIG. 10 is a schematic diagram of an interface of a video playing method according to an example embodiment of the disclosure.

Referring to FIG. 8 and FIG. 10, in a case that the watching attribute of the acting role A is a watch-only attribute, the terminal displays the performance segment 71 corresponding to the acting role A in boldface on the playing progress bar 70 of the playing interface, so that an audience is aware of the performance segment 71 corresponding to the acting role A.

Optionally, in a case that at least two acting roles have the watch-only attribute, the performance segment information of the at least two acting roles is combined, and performance segments corresponding to the combined performance segment information are played. The combining may be calculation of an intersection set (that is, the combined performance segment corresponds to both the at least two acting roles) or a union set (that is, the combined performance segment corresponds to any one of the at least two acting roles).

Optionally, in a case that at least two acting roles are actors of the same gender, the terminal performs combination by calculating a union set of the performance segment information of the at least two acting roles (that is, the combined performance segment information corresponds to any one of the at least two acting roles), and plays only the performance segments corresponding to the combined performance segment information. In a case that at least two acting roles are two actors of opposite genders, because the two actors of opposite genders are generally lovers in the play, the terminal may perform combination by calculating an intersection set of the performance segment information of the at least two acting roles (that is, the combined performance segment information corresponds to both the at least two acting roles), and play only the performance segments corresponding to the combined performance segment information.

Operation 708: Skip, in a case that the watching attribute of the acting role is the ignore attribute, a performance segment corresponding to the acting role according to the performance segment information.

Optionally, in a case that the watching attribute of the acting role is the ignore attribute, the terminal obtains the performance segment information of the acting role. The performance segment information includes one or more performance segments. For each performance segment of the acting role A, at a moment preceding a start time of an $i^{th}$ performance segment, the playing process directly jumps to a moment next to an end time of the $i^{th}$ performance segment, where i is a positive integer. In a case that watching attributes of other acting roles are a normal watch attribute, all other performance segments different from those of the acting role A in the target video will be played.

Optionally, the terminal displays, according to the performance segment information, the performance segment corresponding to the acting role on the playing progress bar of the playing interface in a second distinct display manner. The second distinct display manner may include, for example but not limited to, at least one of the following manners: decreasing display brightness, displaying in a second color belonging to a dim color series, displaying with a second filler pattern, and displaying in reduced size. For example, the performance segment corresponding to the acting role is displayed in gray on the playing progress bar, and other areas are displayed in blue on the playing progress bar.

In a case that at least two acting roles have the ignore attribute, the performance segment information of the at least two acting roles is combined, and performance segments corresponding to the combined performance segment information are skipped. The combining is generally calculation of a union set (that is, the combined performance segment corresponds to any one of the at least two acting roles).

Operation 709: Play, in a case that the watching attribute of the acting role is the quick watch attribute, a performance segment corresponding to the acting role in a fast-forward manner according to the performance segment information.

Optionally, in a case that the watching attribute of the acting role is the fast-forward attribute, the terminal obtains the performance segment information of the acting role. The performance segment information includes one or more performance segments. For each performance segment of the acting role A, when the playing progress comes to the start time of the $i^{th}$ performance segment, the video is played at a preset fast-forward speed; when the playing progress comes to the end time of the $i^{th}$ performance segment, the video is played at a normal speed. In a case that the watching attributes of other acting roles are a normal watch attribute, all other performance segments different from those of the acting role A in the target video will be played at a normal speed.

Optionally, the terminal displays, according to the performance segment information, the performance segment corresponding to the acting role on the playing progress bar of the playing interface in a third distinct display manner. The third distinct display manner may include, for example but not limited to, at least one of the following manners: changing display brightness, displaying in a third color, displaying with a third filler pattern, and displaying by animation. For example, the performance segment corresponding to the acting role is displayed in gray on the playing progress bar, and other areas are displayed in blue on the playing progress bar.

In a case that at least two acting roles have the quick watch attribute, the performance segment information of the at least two acting roles is combined, and performance segments corresponding to the combined performance segment information are played in a fast-forward manner. The combining is generally calculation of a union set (that is, the combined performance segment corresponds to any one of the at least two acting roles).

Accordingly, in the video playing method provided in this example embodiment, the terminal obtains the performance segment information corresponding to at least one acting role in the target video, and selects and plays specific segments of the target video according to the watching attribute and the performance segment information, so that users may watch different acting roles in the same target video in different forms.

Figure 11:
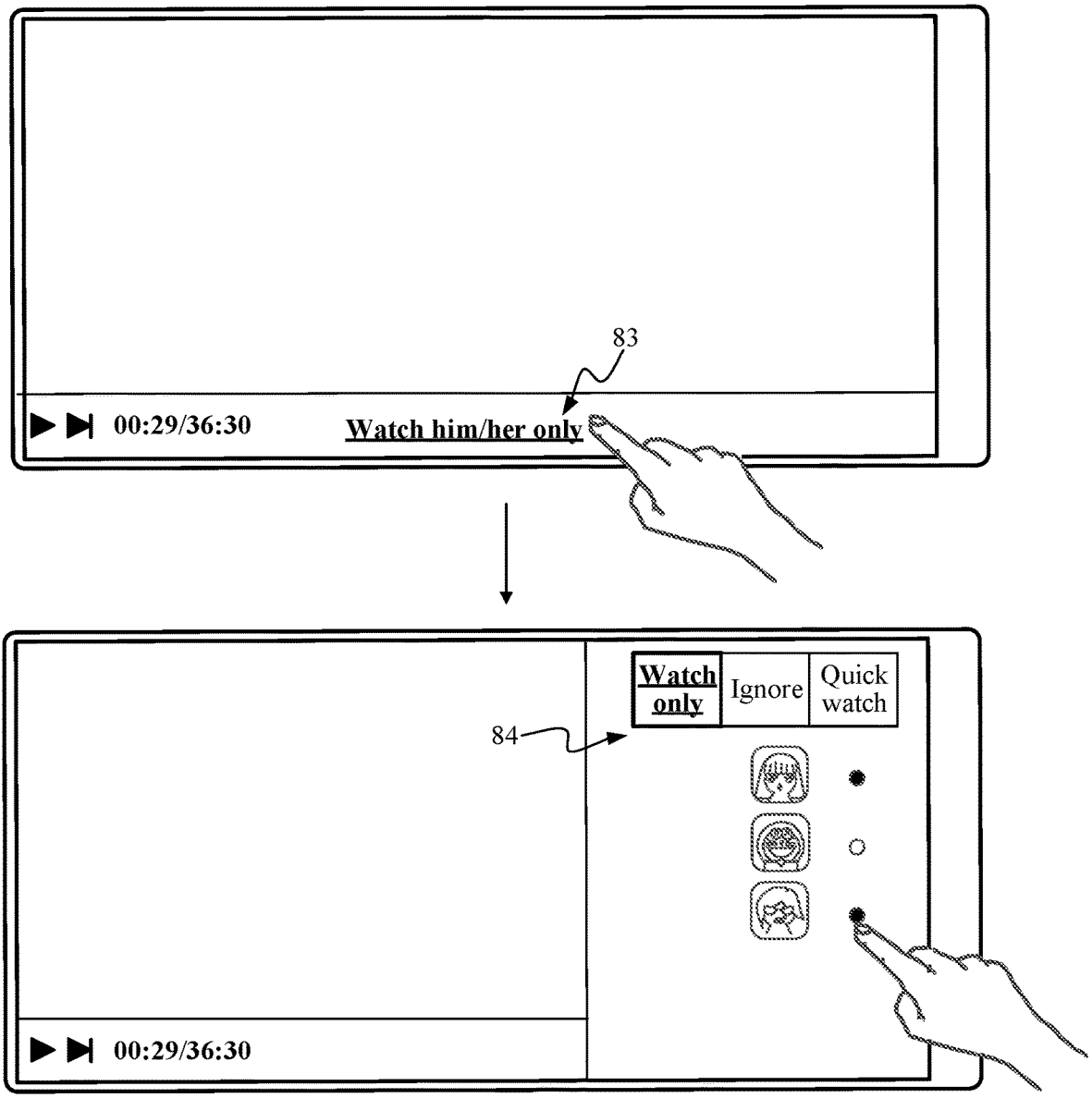
FIG. 11 is a schematic diagram of an interface of a video playing method according to an example embodiment of the disclosure.

In an optional embodiment based on operation 703, the watch setting control is in a hidden state on the playing interface of the target video. Upon receiving a trigger operation of a user, the watch setting control is displayed on the playing interface of the target video. As shown in FIG. 11, during a process of playing the target video, the terminal displays a "Watch him/her only" control 83 on the playing interface. After the "Watch him/her only" control 83 is triggered, the watch setting control 84 is stacked and displayed on the playing interface. The watch setting control 84 includes a watch-only attribute setting area, an ignore attribute setting area, and a quick-watch attribute setting area. FIG. 11 describes the watch-only attribute setting area as an example. In the watch-only attribute setting area, avatars of three acting roles and a check box for setting the watch-only attribute for each acting role may be displayed.

Figure 12:
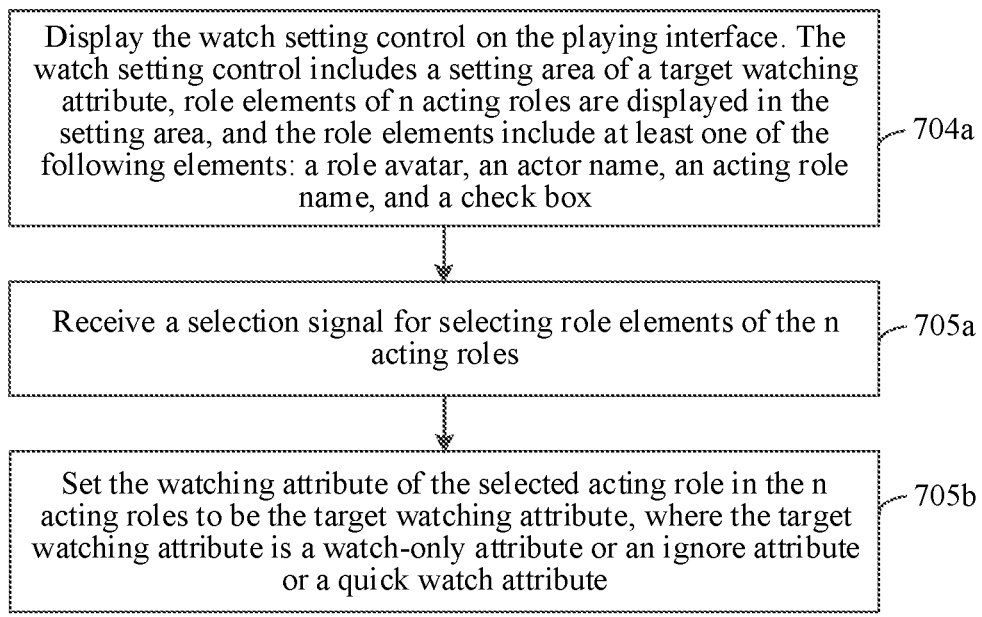
FIG. 12 is a flowchart of a video playing method according to another example embodiment of the disclosure.

In an optional embodiment, operation 704 of displaying a watch setting control of at least one acting role on the playing interface may be replaced with operation 704*a*, and operation 705 may be replaced with operations 705*a* and 705*b*, as shown in FIG. 12:

Operation 704a: Display the watch setting control on the playing interface. The watch setting control includes a setting area of a target watching attribute, and role elements of n acting roles are displayed in the setting area. The role elements include, for example but not limited to, at least one of the following elements: a role avatar, an actor name, an acting role name, and a check box.

The watch setting control includes at least one of the following setting areas: a watch-only attribute setting area, an ignore attribute setting area, and a quick-watch attribute setting area. In the setting area of each watching attribute, role elements of n acting roles are displayed. The type and number of the n acting roles displayed in the setting areas of different watching attributes may be the same or different.

In an optional embodiment, referring to FIG. 11, the watch setting control 84 includes a watch-only attribute setting area, and role avatars of 3 acting roles and a check box are displayed in the watch-only attribute setting area.

Figure 13:
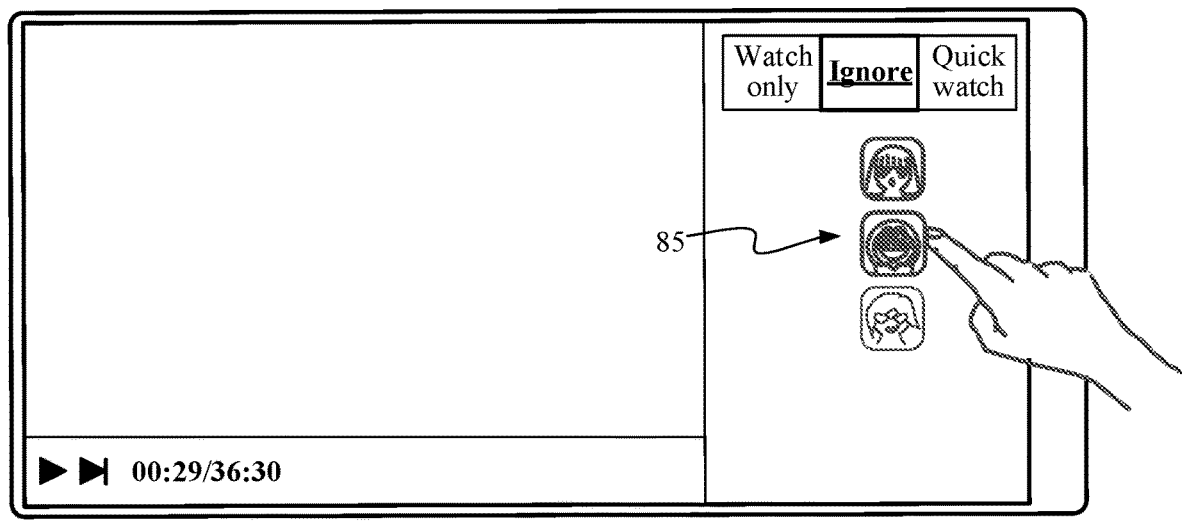
FIG. 13 is a schematic diagram of an interface of a video playing method according to an example embodiment of the disclosure.

In another optional embodiment, referring to FIG. 13, the watch setting control 85 includes an ignore attribute setting area, and role avatars of 3 acting roles are displayed in the ignore attribute setting area.

Figure 14:
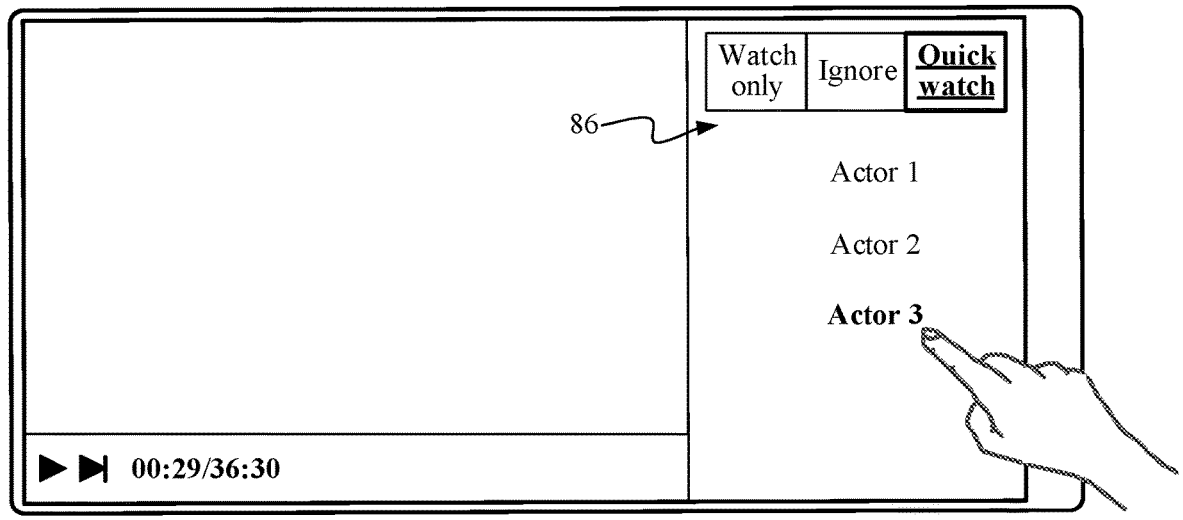
FIG. 14 is a schematic diagram of an interface of a video playing method according to an example embodiment of the disclosure.

In another optional embodiment, referring to FIG. 14, the watch setting control 86 includes a quick-watch attribute setting area, and actor names of 3 acting roles are displayed in the quick-watch attribute setting area.

Figure 15:
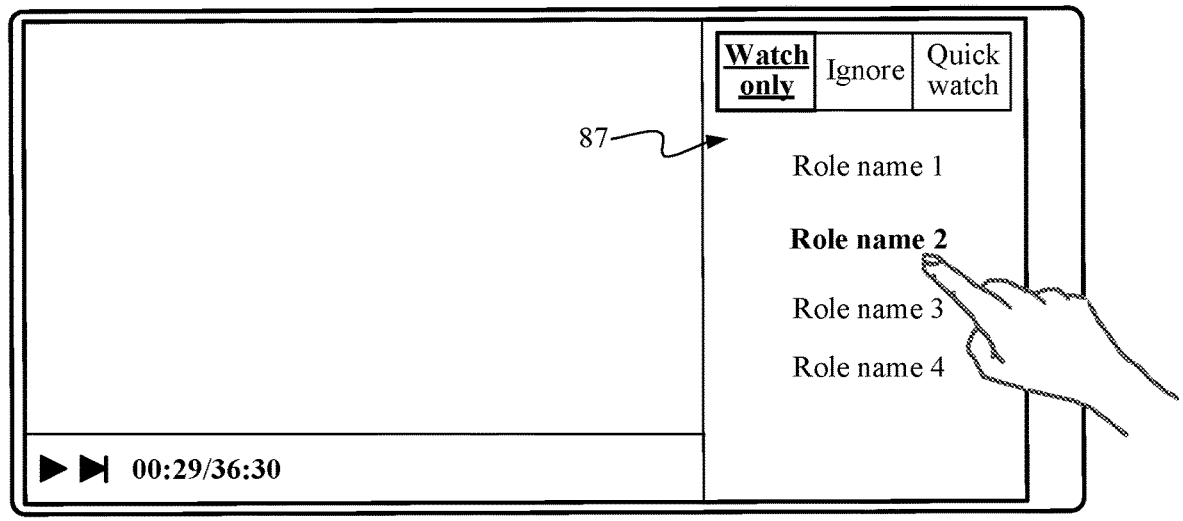
FIG. 15 is a schematic diagram of an interface of a video playing method according to an example embodiment of the disclosure.

In another optional embodiment, referring to FIG. 15, the watch setting control 87 includes a watch-only attribute setting area, and acting role names of 4 acting roles are displayed in the watch-only attribute setting area.

Operation 705a: Receive a selection signal for selecting the role elements of the n acting roles.

Optionally, the selection signal is a selection signal for tapping on a touchscreen.

For example, as shown in FIG. 11, the user selects check boxes of the $1^{st}$ and $3^{rd}$ acting roles in the 3 acting roles, and the terminal determines, according to the selection signal, that the $1^{st}$ and $3^{rd}$ acting roles are selected acting roles for the watch-only attribute. As shown in FIG. 13, the user clicks role avatars of the $1^{st}$ and $2^{nd}$ acting roles in the 3 acting roles, and the terminal determines, according to the click signal, that the $1^{st}$ acting role and the $2^{nd}$ acting role are the selected acting roles for the ignore attribute. The terminal may also highlight the role avatars of the $1^{st}$ and $2^{nd}$ acting roles to distinguish against the role avatar of the unselected $3^{rd}$ acting role. As shown in FIG. 14, the user clicks the actor name of the $3^{rd}$ acting role in the 3 acting roles, and the terminal determines, according to the click signal, that the $3^{rd}$ acting role is the selected acting role for the quick-watch attribute. The terminal may also display in boldface the actor name of the $3^{rd}$ acting role to distinguish against the actor name of the other two unselected acting roles. As shown in FIG. 15, the user clicks the acting role name of the $2^{nd}$ acting role in the 4 acting roles, and the terminal determines, according to the click signal, that the $2^{nd}$ actor name is the selected acting role for the watch-only attribute. The user displays in boldface the acting role name of the $2^{nd}$ acting role to distinguish against the acting role names of the other three unselected acting roles.

Operation 705b: Set the watching attribute of the selected acting role in the n acting roles to be the target watching attribute.

Optionally, the terminal sets the watching attribute of the selected acting role in the n acting roles to be the target watching attribute.

Figure 16:
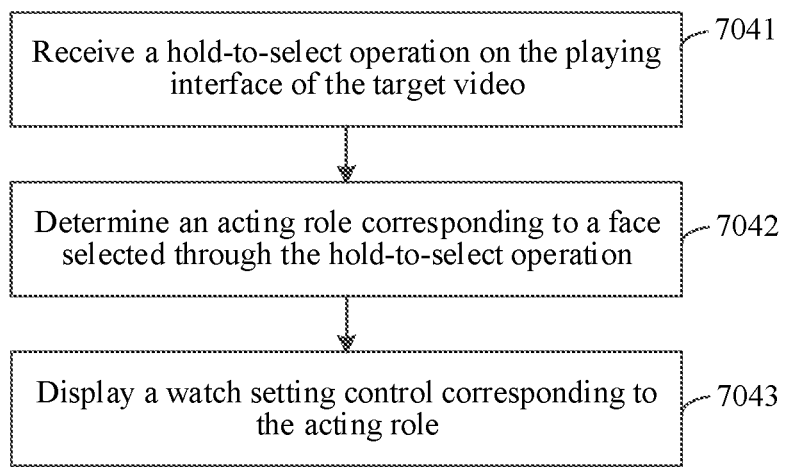
FIG. 16 is a flowchart of a video playing method according to another example embodiment of the disclosure.

In an optional embodiment, operation 704 includes the following operations 7041 to 7043, as shown in FIG. 16:

Operation 7041: Receive a hold-to-select operation on the playing interface of the target video.

The terminal displays the playing interface of the target video. The playing interface displays a video picture of the target video. The video picture displays one or more acting roles. In a case that the user wants to watch only a specific acting role (or not to watch a specific acting role, or to quickly watch a specific acting role), the user may hold down a face area of the acting role on the playing interface of the target video.

The terminal receives a hold-to-select operation of the user on the touchscreen.

Operation 7042: Determine an acting role corresponding to a face selected through the hold-to-select operation.

The terminal determines, according to the hold-to-select operation of the user, a held-down location of the hold-to-select operation and a first image frame (one or more frames) that appears during the holding operation. The face area corresponding to the held-down location in the first image frame is identified, so that the acting role corresponding to the face area is identified.

Operation 7043: Display a watch setting control corresponding to the acting role.

The terminal stacks and displays the watch setting control corresponding to the acting role on the playing interface of the target video. Optionally, the terminal displays the watch setting control corresponding to the acting role at a preset location on the playing interface, or the terminal displays the watch setting control corresponding to the acting role in a peripheral area of the held-down location.

Figure 17:
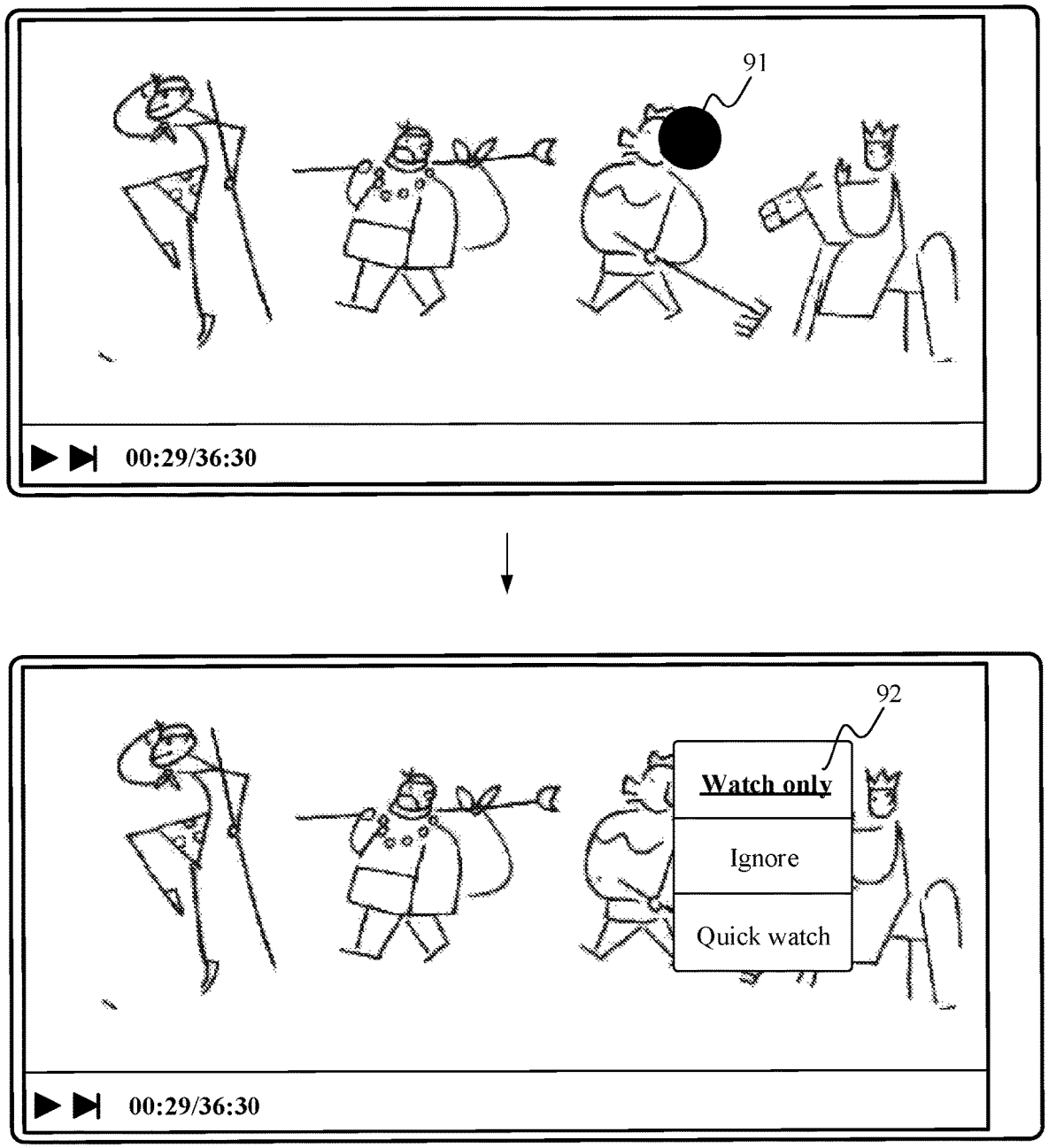
FIG. 17 is a schematic diagram of an interface of a video playing method according to an example embodiment of the disclosure.

Referring to FIG. 17, four acting roles are displayed on the playing interface: Sun Wukong, Sand Monk, Pig Bajie, and Tang Monk. In a case that the user wishes to watch only the performance segments of Pig Bajie, the user may perform a hold-to-select operation on the face area 91 of Pig Bajie. The terminal recognizes the face area 91 according to the hold-to-select operation, and recognizes that the acting role is Pig Bajie, and then stacks and displays a watch setting control 92 corresponding to Pig Bajie at the location of the face area 91. The watch setting control 92 displays a "Watch-only" option, an "Ignore" option, and a "Quick watch" option. The user may click the "Watch only" option to trigger watching only the performance segments of Pig Bajie. Alternatively, the user may click the "Ignore" option to trigger not watching the performance segments of Pig Bajie. Alternatively, the user may click the "Quick watch" option to trigger fast-forwarding of the performance segments of Pig Bajie.

Accordingly, in the method provided in this example embodiment, in a case that the user does not know the name of the acting role in advance, the user may perform a hold-to-select operation to trigger the terminal to display the watch setting control corresponding to the acting role, thereby improving efficiency of man-machine interaction between the user and the terminal and efficiency of triggering the watch setting control.

Figure 18:
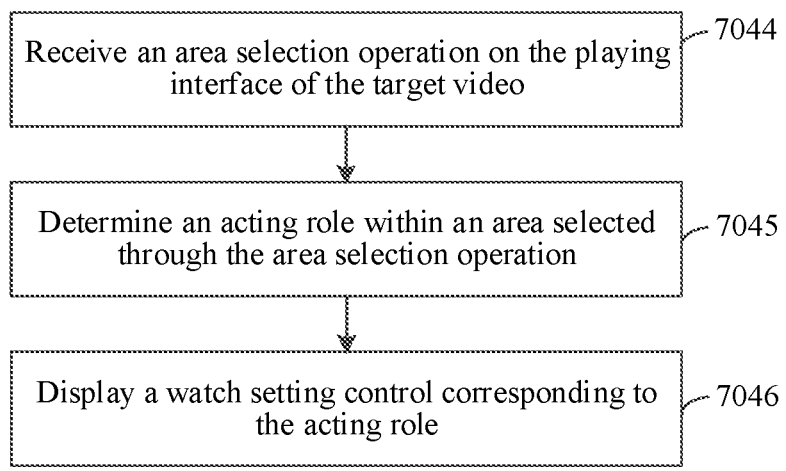
FIG. 18 is a flowchart of a video playing method according to another example embodiment of the disclosure.

In an optional embodiment, operation 704 includes the following operations 7044 to 7046, as shown in FIG. 18:

Operation 7044: Receive an area selection operation on the playing interface of the target video.

The terminal displays the playing interface of the target video. The playing interface displays a video picture of the target video. The video picture displays one or more acting roles. In a case that the user wants to watch only a specific acting role (or not to watch a specific acting role, or to quickly watch a specific acting role), the user may draw a closed curve in a face area of the acting role on the playing interface of the target video to make a selection. That is, the area selection operation may be an operation performed by the user by drawing a closed curve through a touch operation, so as to select the acting role located in the area selected by the closed curve.

Operation 7045: Determine an acting role within an area selected through the area selection operation.

There may be one or more acting roles within the area selected through the area selection operation.

The terminal determines, according to the area selection operation of the user, an area selected by the area selection operation and a second image frame (one or more frames) that appears during the operation. The face area corresponding to the selected area in the second image frame is identified, so that the acting role corresponding to the face area is identified.

Operation 7046: Display a watch setting control corresponding to the acting role.

The terminal stacks and displays the watch setting control corresponding to the acting role on the playing interface of the target video. Optionally, the terminal displays the watch setting control corresponding to the acting role at a preset location on the playing interface, or the terminal displays the watch setting control corresponding to the acting role in a peripheral area of the held-down location.

Figure 19:
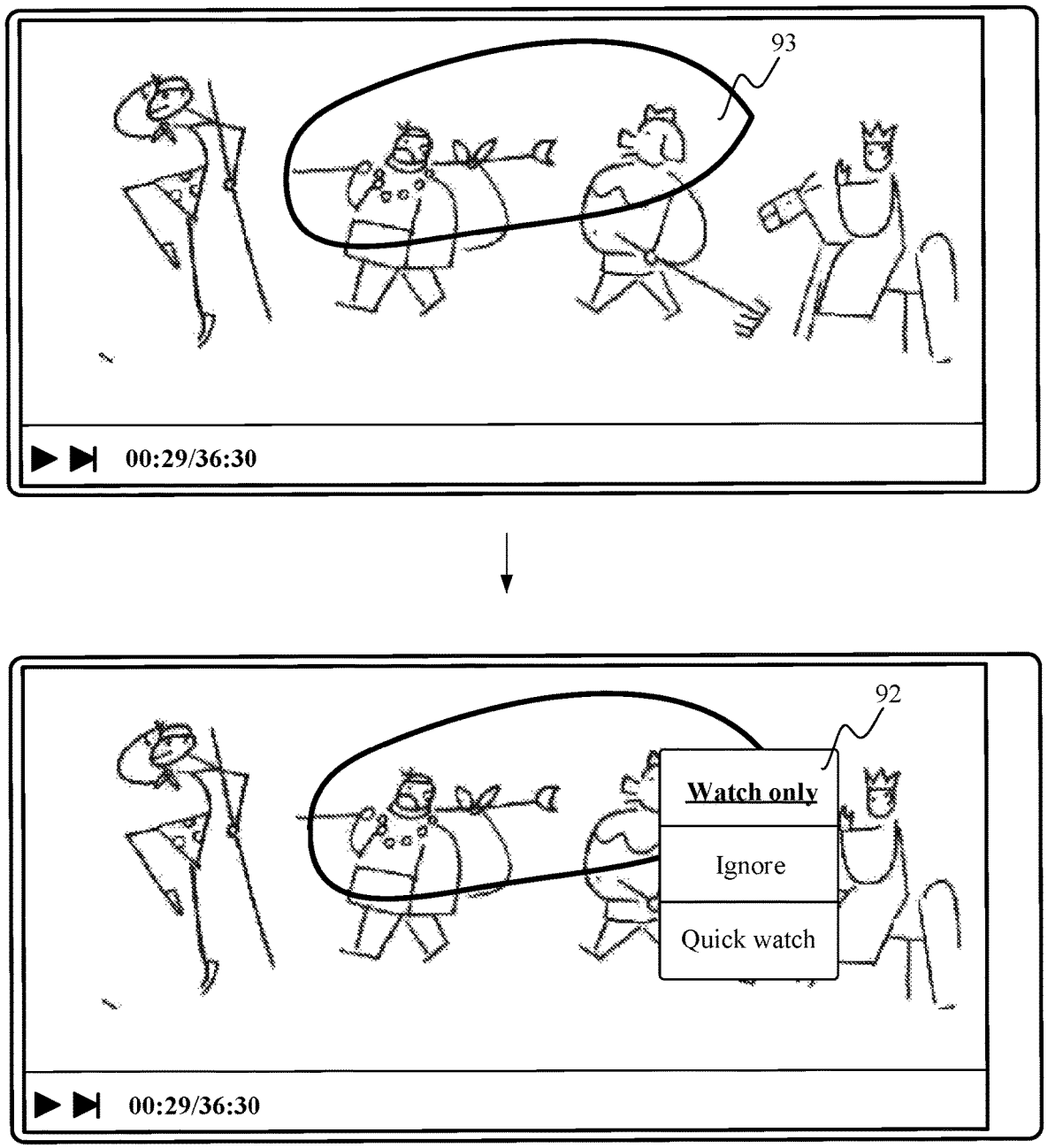
FIG. 19 is a schematic diagram of an interface of a video playing method according to an example embodiment of the disclosure.

Referring to FIG. 19, four acting roles are displayed on the playing interface: Sun Wukong, Sand Monk, Pig Bajie, and Tang Monk. In a case that the user wishes to watch only the performance segments of Sand Monk and Pig Bajie, the user may perform an area selection operation on the face areas 93 of Sand Monk and Pig Bajie. The terminal recognizes the face areas 93 according to the area selection operation, and recognizes that the acting roles are Sand Monk and Pig Bajie, and then stacks and displays the watch setting control 92 corresponding to Pig Bajie at the location of the face area 93. The watch setting control 92 displays a "Watch-only" option, an "Ignore" option, and a "Quick watch" option. The user may click the "Watch only" option to trigger watching only the performance segments of Sand Monk and Pig Bajie. Alternatively, the user may click the "Ignore" option to trigger not watching the performance segments of Sand Monk and Pig Bajie. Alternatively, the user may click the "Quick watch" option to trigger fast-forwarding of the performance segments of Sand Monk and Pig Bajie.

Accordingly, in the method provided in this example embodiment, in a case that the user does not know the name of the acting role in advance, the user may perform an area selection operation to trigger the terminal to display the watch setting control corresponding to the acting role, thereby improving efficiency of man-machine interaction between the user and the terminal and efficiency of triggering the watch setting control.

Figure 20:
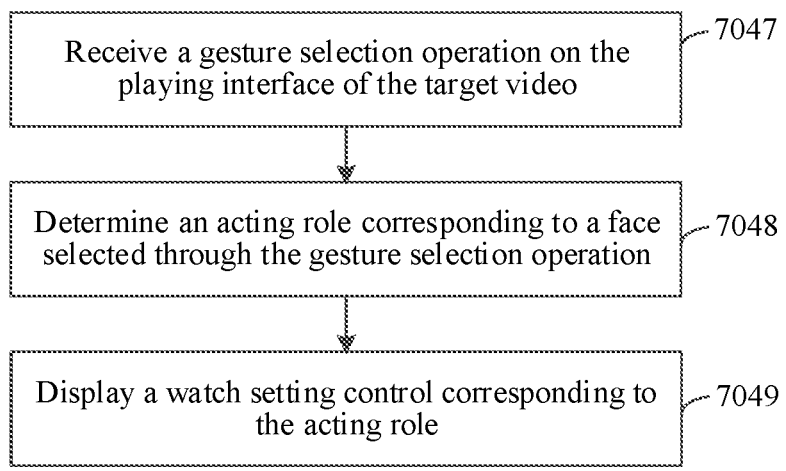
FIG. 20 is a flowchart of a video playing method according to another example embodiment of the disclosure.

In an optional embodiment, operation 704 includes the following operations 7047 to 7049, as shown in FIG. 20:

Operation 7047: Receive a gesture selection operation on the playing interface of the target video.

The terminal displays the playing interface of the target video. The playing interface displays a video picture of the target video. The video picture displays one or more acting roles. In a case that the user wants to watch only a specific acting role (or not to watch a specific acting role, or to quickly watch a specific acting role), the user may draw a gesture in a face area of the acting role on the playing interface of the target video to make a selection. That is, the gesture selection operation may be a touch operation performed by the user by drawing in a preset pattern. The preset pattern may be a tick, a cross, or an arrow. This example embodiment does not limit the specific form of the preset pattern of the touch operation.

For example, the tick indicates an intention of triggering the watch-only attribute of the acting role, the cross indicates an intention of triggering the ignore attribute of the acting role, and the arrow indicates an intention of triggering the quick watch attribute of the acting role.

Operation 7048: Determine an acting role corresponding to a face selected through the gesture selection operation.

The terminal determines, according to the gesture selection operation of the user, an area effected by the gesture selection operation and a third image frame (one or more frames) that appears during the operation. The face area corresponding to the effected area in the third image frame is identified, so that the acting role corresponding to the face area is identified.

Operation 7049: Display a watch setting control corresponding to the acting role.

The terminal stacks and displays the watch setting control corresponding to the acting role on the playing interface of the target video. Optionally, the terminal displays the watch setting control corresponding to the acting role at a preset location on the playing interface, or the terminal displays the watch setting control corresponding to the acting role in a peripheral area of the held-down location.

Figure 21:
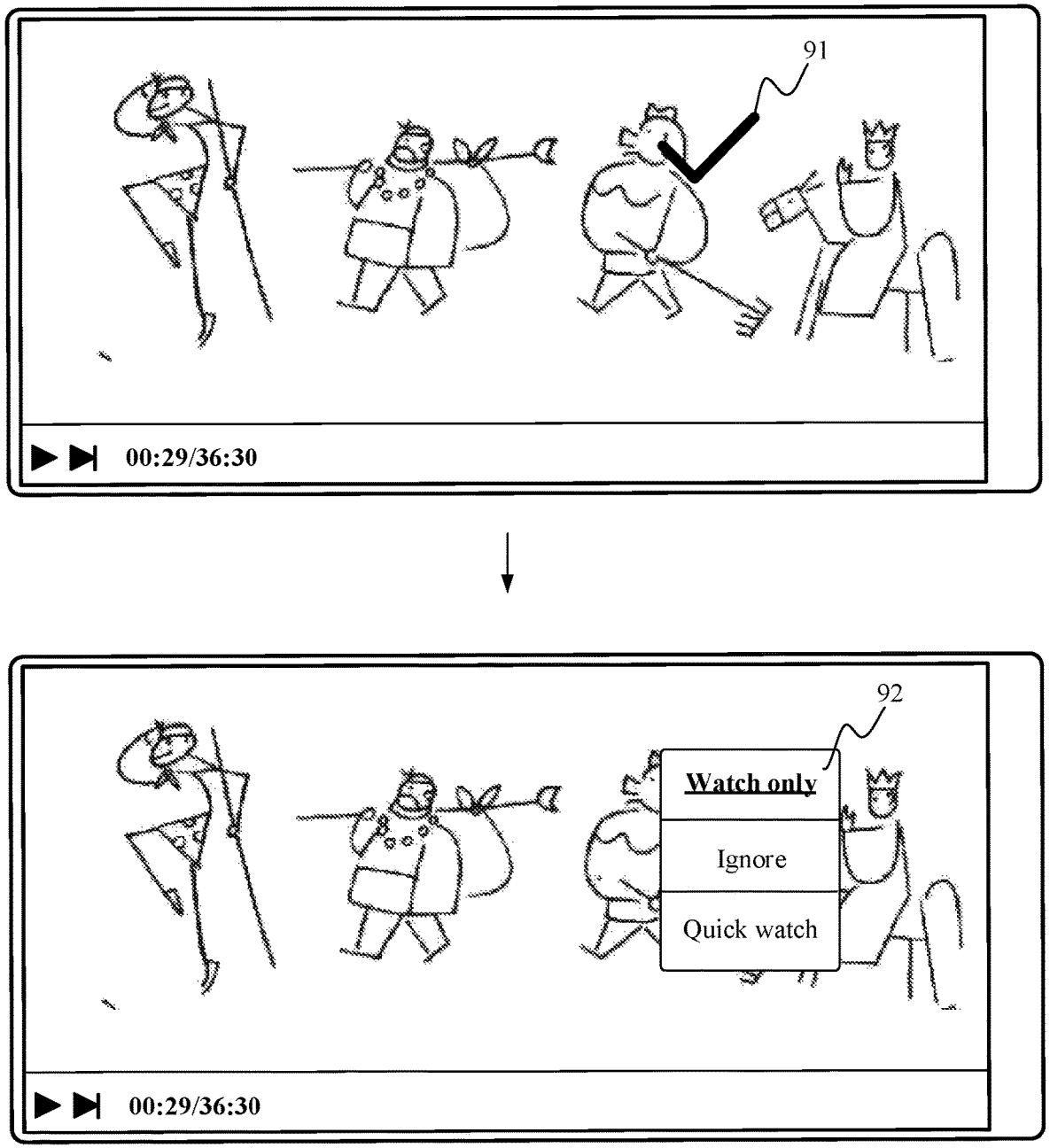
FIG. 21 is a schematic diagram of an interface of a video playing method according to an example embodiment of the disclosure.

Referring to FIG. 21, four acting roles are displayed on the playing interface: Sun Wukong, Sand Monk, Pig Bajie, and Tang Monk. In a case that the user wishes to watch only the performance segments of Pig Bajie, the user may perform a tick drawing operation 91 on the face area of Pig Bajie. The terminal recognizes the face area selected according to the tick drawing operation, and recognizes that the acting role of which the face area is selected is Pig Bajie, and then stacks and displays the watch setting control 92 corresponding to Pig Bajie at the location of the face area of Pig Bajie. On the watch setting control 92, a "Watch Only" option, an "Ignore" option, and a "Quick watch" option are displayed, and the "Watch only" option is selected by default, so that the user may quickly activate the function of watching only the performance segments of Pig Bajie.

Figure 22:
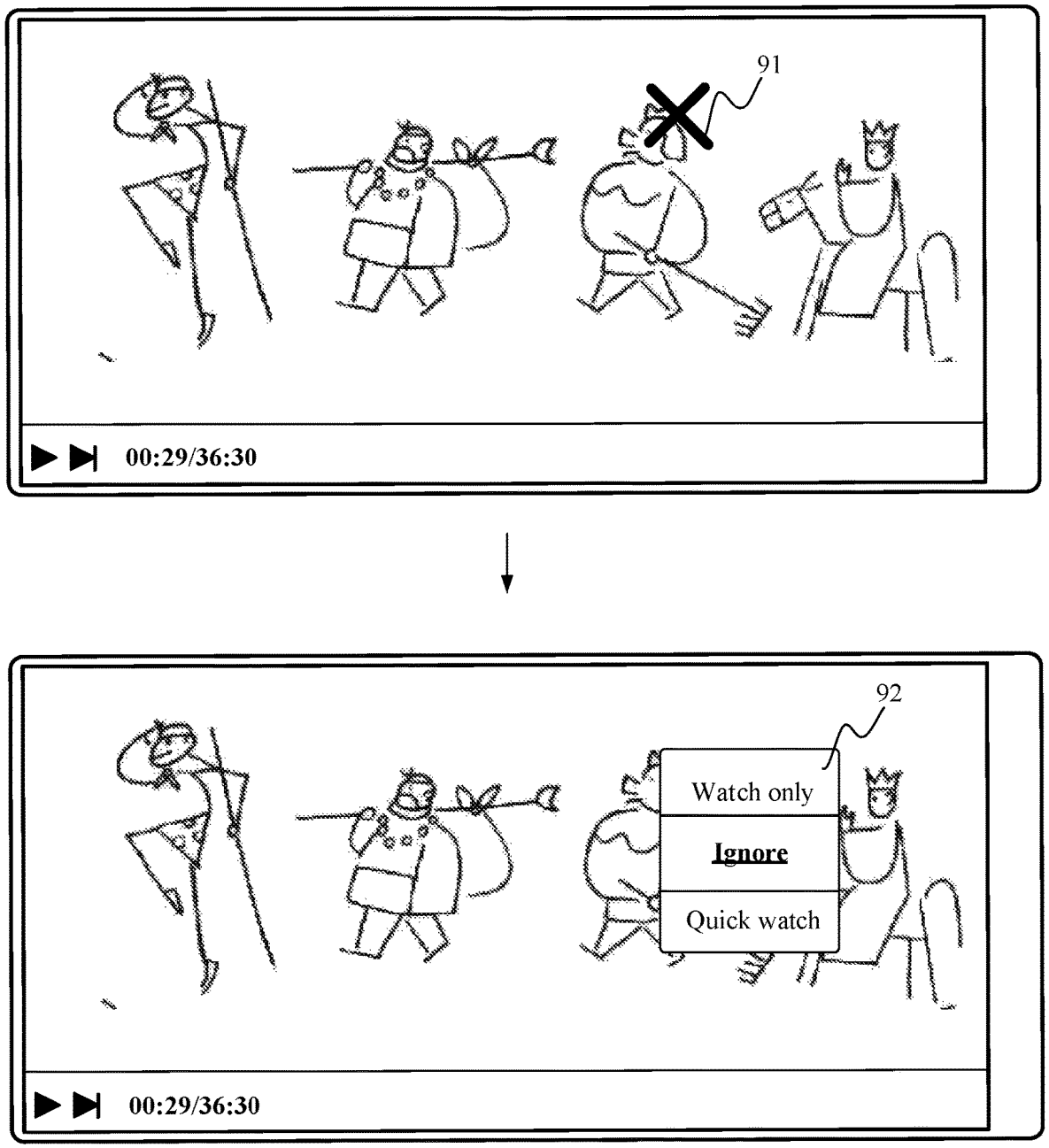
FIG. 22 is a schematic diagram of an interface of a video playing method according to an example embodiment of the disclosure.

Referring to FIG. 22, four acting roles are displayed on the playing interface: Sun Wukong, Sand Monk, Pig Bajie, and Tang Monk. In a case that the user wishes to watch only the performance segments of Pig Bajie, the user may perform a cross drawing operation 91 on the face area of Pig Bajie. The terminal recognizes the face area selected according to the cross drawing operation, and recognizes that the acting role of which the face area is selected is Pig Bajie, and then stacks and displays the watch setting control 92 corresponding to Pig Bajie at the location of the face area of Pig Bajie. On the watch setting control 92, a "Watch Only" option, an "Ignore" option, and a "Quick watch" option are displayed, and the "Ignore" option is selected by default, so that the user may quickly activate the function of ignoring the performance segments of Pig Bajie.

Accordingly, in the method provided in this example embodiment, in a case that the user does not know the name of the acting role in advance, the user may perform a gesture selection operation to trigger the terminal to display the watch setting control corresponding to the acting role, thereby improving efficiency of man-machine interaction between the user and the terminal and efficiency of triggering the watch setting control.

The following describes an apparatus for labeling a performance segment according to example embodiments. A correspondence exists between the apparatus embodiment(s)

and the method embodiment(s) for a method for labeling a performance segment according to example embodiments described above. Details not given in the apparatus embodiment may be obtained with reference to the method embodiment(s).

Figure 23:
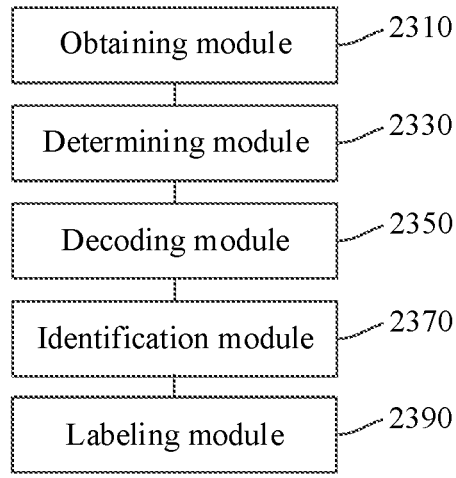
FIG. 23 is a block diagram of an apparatus for labeling a performance segment according to an example embodiment of the disclosure.

Refer to FIG. 23, which is a block diagram of an apparatus for labeling a performance segment according to an example embodiment of the disclosure. The apparatus for labeling a performance segment may be implemented as a video server or an internal functional module of a video server. The apparatus includes: an obtaining module 2310, a determining module 2330, a decoding module 2350, an identification module 2370, and a labeling module 2390.

The obtaining module 2310 is configured to obtain a multimedia file corresponding to an acting role.

The determining module 2330 is configured to determine a role feature of the acting role according to the multimedia file.

The decoding module 2350 is configured to decode a target video to obtain a data frame and a playing timestamp corresponding to the data frame, the data frame including a video frame and/or an audio frame.

The identification module 2370 is configured to identify, in the data frame of the target video, a target data frame that matches the role feature.

The labeling module 2390 is configured to automatically label performance segment information corresponding to the acting role according to a playing timestamp of the target data frame.

In an optional embodiment, the role feature includes a voiceprint feature of the acting role, and the identification module 2370 is configured to identify, in the audio frame of the target video, a target audio frame that matches the voiceprint feature.

In an optional embodiment, the obtaining module 2310 is configured to obtain in-play audio data of the acting role. The in-play audio data is audio data of the acting role in the target video. The determining module 2330 is configured to extract the voiceprint feature of the acting role from the in-play audio data.

In an optional embodiment, the obtaining module 2310 is configured to obtain a cast list of the target video; capture, in a case that existence of a name of a voice actor of the acting role is determined according to the cast list, actor audio data from a network resource according to the name of the voice actor; or obtain, in a case that a name of a voice actor of the acting role is determined to be nonexistent according to the cast list, a name of a leading actor of the acting role, and capturing actor audio data from a network resource according to the name of the leading actor. The determining module 2330 is configured to extract the audio feature of the acting role from the actor audio data.

In an optional embodiment, the role feature includes a face feature of the acting role, and the obtaining module 2310 is configured to identify, in the image frame of the target video, a target image frame that matches the face feature.

In an optional embodiment, the obtaining module 2310 is configured to obtain stills image data of the acting role. The stills image data is stills of the acting role in the target video. The determining module 2330 is configured to extract the face feature of the acting role from the stills image data.

In an optional embodiment, the obtaining module 2310 is configured to obtain a cast list of the target video; and capture an actor image corresponding to the actor name from a character encyclopedia page according to the actor name of the acting role in the cast list. The determining module 2330 is configured to extract the face feature of the acting role from the actor image.

In an optional embodiment, the determining module 2330 is configured to obtain, in a case that at least two actor images corresponding to the actor name exist, an image shooting time corresponding to the actor image; and determine that an acting role image whose image shooting time is closest to a video shooting time of the target video is an actor image to be extracted.

In an optional embodiment, the labeling module 2390 is configured to combine, in a case that the target data frame includes at least one target image frame, consecutive timestamps of the at least one target image frame to obtain at least one piece of first segment information of the acting role; or, the labeling module 2390 is configured to combine, in a case that the target data frame includes at least one target audio frame, consecutive timestamps of the at least one target data frame to obtain at least one piece of second segment information of the acting role; or, the labeling module 2390 is configured to combine, in a case that the target data frame includes both at least one target image frame and at least one target audio frame, consecutive timestamps of the at least one target image frame to obtain at least one piece of first segment information of the acting role; and combine consecutive timestamps of the at least one target audio frame to obtain at least one piece of second segment information of the acting role; and obtain third segment information of the acting role according to a union set of the first segment information and the second segment information.

Figure 24:
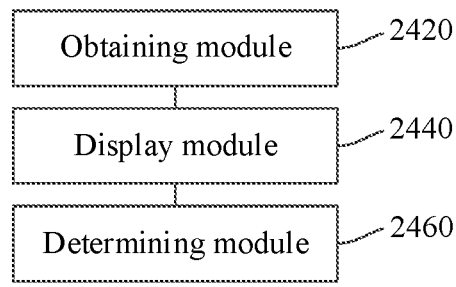
FIG. 24 is a block diagram of a video playing apparatus according to an example embodiment of the disclosure.

Refer to FIG. 24, which is a block diagram of a video playing apparatus according to an example embodiment of the disclosure. The video playing apparatus may be implemented as a terminal or an internal functional module of a terminal. The apparatus includes a display module 2420, a determining module 2440, and an obtaining module 2460.

The display module 2420 is configured to display a playing interface of a target video.

The display module 2420 is further configured to display a watch setting control of at least one acting role on the playing interface.

The determining module 2440 is configured to determine a watching attribute of the acting role according to an operation received on the watch setting control. The watching attribute includes at least one of the following attributes: a watch-only attribute, an ignore attribute, and quick watch attribute.

The obtaining module 2460 is configured to obtain performance segment information of the acting role in the target video, the performance segment information being automatically labeled according to a role feature of the acting role, and the role feature being determined according to a multimedia file corresponding to the acting role.

The display module 2420 is further configured to play the target video according to the watching attribute and the performance segment information.

In an optional embodiment, the display module 2420 is configured to play, in a case that the watching attribute of the acting role is the watch-only attribute, only a performance segment corresponding to the acting role according to the performance segment information; skip, in a case that the watching attribute of the acting role is the ignore attribute, a performance segment corresponding to the acting role according to the performance segment information; or fast-forward, in a case that the watching attribute of the acting role is the quick watch attribute, a performance segment corresponding to the acting role according to the performance segment information.

In an optional embodiment, the display module 2420 is configured to combine, in a case that at least two acting roles have the watch-only attribute, the performance segment information of the at least two acting roles, and play only performance segments corresponding to the combined performance segment information; and/or, the display module 2420 is configured to combine, in a case that at least two acting roles have the ignore attribute, the performance segment information of the at least two acting roles, and skip performance segments corresponding to the combined performance segment information; and/or, the display module 2420 is configured to combine, in a case that at least two acting roles have the quick watch attribute, the performance segment information of the at least two acting roles, and fast-forward performance segments corresponding to the combined performance segment information.

In an optional embodiment, the display module 2420 is configured to receive a hold-to-select operation on the playing interface; determine an acting role corresponding to a face selected by the hold-to-select operation; and display a watch setting control corresponding to the acting role.

In an optional embodiment, the display module 2420 is configured to receive an area selection operation on the playing interface; determine an acting role in an area selected by the area selection operation; and display a watch setting control corresponding to the acting role.

In an optional embodiment, the display module 2420 is configured to receive a gesture selection operation on the playing interface; determine an acting role corresponding to a face selected by the gesture selection operation; and display a watch setting control corresponding to the acting role.

In an optional embodiment, the display module 2420 is configured to display a playing interface that has a playing window of the target video. A playing progress bar on the playing window displays at least one performance segment, and each performance segment corresponds to a respective acting role.

In an optional embodiment, the display module 2420 is configured to display the watch setting control on the playing interface. The watch setting control includes a setting area of a target watching attribute. Role elements of n acting roles are displayed in the setting area, and the role elements include, for example but not limited to, at least one of the following elements: a role avatar, an actor name, an acting role name, and a check box. The determining module 2440 is configured to receive a selection signal for selecting the role elements of the n acting roles; and set a watching attribute of an acting role selected among the n acting roles to the target watching attribute. The target watching attribute includes at least one of the following attributes: the watch-only attribute, the ignore attribute, and the quick watch attribute.

In a case that the apparatus for labeling a performance segment or the video playing apparatus according to the foregoing example embodiments labels performance segment information of an acting role, structural division for the functional modules is described as only an example. In practical applications, the foregoing functions may be assigned to and performed by different functional modules as required. That is, an internal structure of a device may be divided into different functional modules to perform all or a part of the functions described above. In addition, the apparatus for labeling a performance segment/the displaying apparatus according to the foregoing example embodiment is based on the same concept as the video labeling method/playing method. For details of a specific implementation process of the apparatus, refer to the method embodiment, and details are omitted here.

Figure 25:
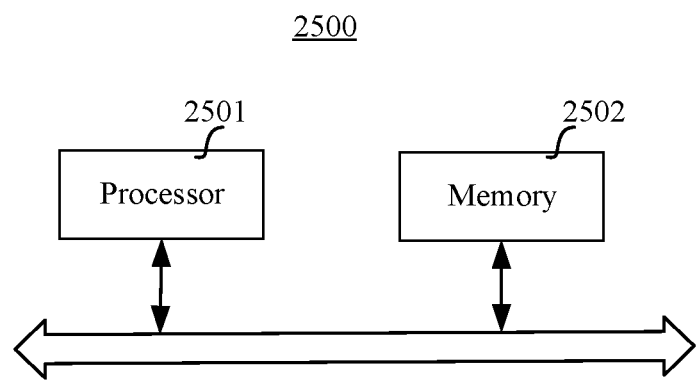
FIG. 25 is a block diagram of a terminal according to an example embodiment of the disclosure.

FIG. 25 shows a structural block diagram of a terminal 2500 according to an example embodiment of the disclosure. The terminal 2500 may be a smartphone, a tablet computer, a moving picture experts group audio layer III (MP3) player, a moving picture experts group audio layer IV (MP4) player, a notebook computer, or a desktop computer. The terminal 2500 may also be referred to as another name such as user equipment, a portable terminal, a laptop terminal, or a desktop terminal.

Generally, the terminal 2500 includes a processor 2501 and a memory 2502.

The processor 2501 includes one or more processing cores, for example, a 4-core processor or an 8-core processor. The processor 2501 may be implemented by using at least one hardware form of digital signal processing (DSP), a field-programmable gate array (FPGA), and a programmable logic array (PLA). The processor 2501 may also include a main processor and a coprocessor. The main processor is a processor configured to process data in a wake-up state, and is also referred to as a central processing unit (CPU). The coprocessor is a low-power processor configured to process data in a standby state. In some embodiments, the processor 2501 may integrate a graphics processing unit (GPU). The GPU is configured to render and draw content that needs to be displayed on a display screen. In some embodiments, the processor 2501 may further include an artificial intelligence (AI) processor. The AI processor is configured to process a computer operation related to machine learning.

The memory 2502 may include one or more computer-readable storage media. The computer-readable storage medium may be non-transient. The memory 2502 may include a high-speed random access memory, and a non-volatile memory such as one or more magnetic disk storage devices and a flash storage device. In some embodiments, the non-transient computer-readable storage medium in the memory 2502 is configured to store at least one instruction, the at least one instruction is configured for being executed by the processor 2501 to implement the video playing method provided in method embodiments of the disclosure.

Persons skilled in the art may understand that the structure shown in FIG. 25 constitutes no limitation to the terminal 2500, and the terminal 2500 may include more or fewer components than those shown in the figure, or some components may be combined, or a different component deployment may be used.

The disclosure further provides a server, including a processor and a memory, the memory storing at least one instruction, and the at least one instruction being loaded and executed by the processor to implement the method for labeling a performance segment provided in the foregoing method embodiments. The server may be a server provided in the following FIG. 26.

Figure 26:
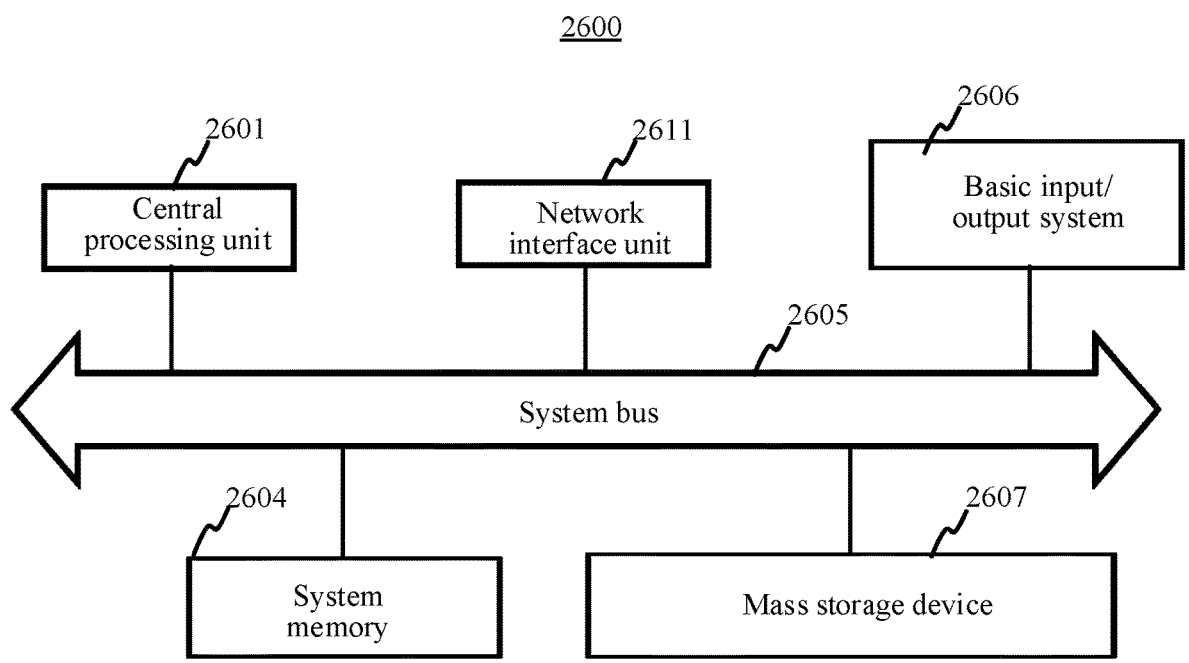
FIG. 26 is a block diagram of a server according to an example embodiment of the disclosure.

FIG. 26 is a schematic structural diagram of a server according to an example embodiment. The server 2600 includes a CPU 2601, a system memory 2604, and a system bus 2605 connecting the system memory 2604 and the CPU 2601. The server 2600 further includes a basic input/output system (I/O system) 2606 helping transmit information between components in a computer, and a large-capacity storage device 2607.

The large-capacity storage device 2607 is connected to the CPU 2601 by using a large-capacity—storage controller (not shown) connected to the system bus 2605. The large-capacity storage device 2607 and an associated computer-readable medium provide non-volatile storage for the server 2600. That is, the large-capacity storage device 2607 may include a computer readable medium (not shown) such as a hard disk drive or a CD-ROM driver.

The system memory 2604 and the large-capacity storage device 2607 may be collectively referred to as memories.

The server 2600 may be connected to the Internet or another network device by using a network interface unit 2611 connected to the system bus 2605.

The memory further includes one or more programs. The one or more programs are stored in the memory. The CPU 2601 executes the one or more programs to implement that the memory further includes one or more programs, the one or more programs being stored in the memory, and including operations performed by the server in the method for labeling a performance segment provided in the example embodiments of the disclosure.

The disclosure further provides a non-transitory computer-readable storage medium. The storage medium stores at least one instruction, the at least one instruction being loaded and executed by a processor to implement the method for labeling a performance segment or the video playing method provided in the foregoing method embodiments.

The disclosure further provides a computer program product, and the computer program product, when being run on a computer, causing the computer to perform the method for labeling a performance segment or the video playing method provided in the foregoing method embodiments.

The sequence numbers of the foregoing example embodiments of the disclosure are merely for the convenience of description, and do not imply the preference among the example embodiments.

A person of ordinary skill in the art may understand that all or some of operations of the example embodiments may be implemented by hardware or a program instructing related hardware. The program may be stored in a computer-readable storage medium. The storage medium may be a read-only memory (ROM), a magnetic disk or an optical disc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A method for labeling a segment of a video, in a server, the method comprising:

obtaining a multimedia file corresponding to an acting role;

determining a role feature of the acting role based on the multimedia file;

obtaining a video playing request including a video identifier of a target video, and decoding the target video to obtain a data frame and a playing timestamp corresponding to the data frame, the data frame comprising at least one of a video frame and an audio frame;

identifying, in the data frame of the target video, a target data frame that matches the role feature;

automatically labeling a segment in which performance of the acting role appears in the target video based on a playing timestamp of the target data frame;

displaying a playing interface of the target video, in which the target video is being played, and receiving a user operation to select an area, including at least one face area, on the playing interface of the target video; and based on the user operation to select the area on the playing interface of the target video, displaying, on the playing interface to be superimposed on the target video, a list of (i) a "watch-only" option, (ii) an "ignore" option, and (iii) a "fast-forward" option, (i) the "watch-only" option being configured to trigger, upon selection, playing of the target video such that only first segments within the target video, in which performance of at least one acting role corresponding to the at least one face area included in the selected area appears, are played, (ii) the "ignore" option being configured to trigger, upon selection, playing of the target video such that playing of the first segments within the target video is skipped and segments other than the first segments in the target video are played, and (iii) the "fast-forward" option being configured to trigger, upon selection, playing of the target video such that playing of the first segments within the target video is performed at a preset fast-forward speed, wherein, based on the "ignore" option being selected, at a start time of a performance segment of the at least one acting role corresponding to the at least one face area, the playing of the target video jumps to an end time of the performance segment, wherein based on one of (i) the "watch-only" option, (ii) the "ignore" option, and (iii) the "fast-forward" option being triggered, the first segments is displayed in a distinctive manner, with respect to at least one of a color, a thickness, a brightness, or a filter pattern, from other segments of the target video in a playing progressive bar of the playing interface of the target video, and wherein based on a first drawing pattern of the user operation to select the area on the playing interface of the target video, the "watch-only" option is selected by default in the list for the user to confirm to trigger, and based on a second drawing pattern of the user operation to select the area on the playing interface of the target video, the "ignore" option is selected by default in the list for the user to confirm to trigger.

2. The method according to claim 1, wherein the role feature comprises a voiceprint feature of the acting role, and the identifying the target data frame comprises:

identifying, in the audio frame of the target video, a target audio frame that matches the voiceprint feature.

3. The method according to claim 2, wherein the obtaining the multimedia file comprises:

obtaining in-play audio data of the acting role, the in-play audio data being audio data of the acting role in the target video, and wherein the voiceprint feature comprises the voiceprint feature of the acting role extracted from the in-play audio data.

4. The method according to claim 2, wherein the obtaining the multimedia file comprises:

obtaining a cast list of the target video; and performing (i) capturing actor audio data from a network resource based on a name of a voice actor of the acting role in the cast list, or (ii) based on a determination that the name of the voice actor of the acting role does not exist in the cast list, obtaining a name of a leading actor of the acting role, and capturing actor audio data from the network resource based on the name of the leading actor, and wherein the role feature comprises an audio feature of the acting role extracted from the actor audio data.

5. The method according to claim 1, wherein the role feature comprises a face feature of the acting role, and the identifying the target data frame comprises:

identifying, in an image frame of the target video, a target image frame that matches the face feature.

6. The method according to claim 5, wherein the obtaining the multimedia file comprises:

obtaining stills image data of the acting role, the stills image data being stills of the acting role in the target video, and wherein the role feature comprises the face feature of the acting role extracted from the stills image data.

7. The method according to claim 5, wherein the obtaining the multimedia file comprises:

obtaining a cast list of the target video; and capturing an actor image from a character encyclopedia page based on an actor name of the acting role in the cast list and wherein the role feature comprises the face feature of the acting role extracted from the actor image.

8. The method according to claim 7, further comprising:

based on at least two actor images corresponding to the actor name in the character encyclopedia page, obtaining an image shooting time corresponding to the at least two actor images; and extracting the face feature from an acting role image of which the image shooting time is closest to a video shooting time of the target video.

9. The method according to claim 1, wherein the automatically labeling comprises:

based on the target data frame comprising at least one target image frame, combining consecutive timestamps of the at least one target image frame to obtain at least one piece of first segment information of the acting role; or based on the target data frame comprising at least one target audio frame, combining consecutive timestamps of the at least one target audio frame to obtain at least one piece of second segment information of the acting role; or based on the target data frame comprising the at least one target image frame and the at least one target audio frame, combining consecutive timestamps of the at least one target image frame to obtain the at least one piece of first segment information of the acting role; combining consecutive timestamps of the at least one target audio frame to obtain the at least one piece of second segment information of the acting role; and obtaining third segment information of the acting role based on a combination of the at least one piece of first segment information and the at least one piece of second segment information.

10. An apparatus for labeling a segment of a video, comprising:

at least one memory configured to store program code; and at least one processor configured to read the program code and operate as instructed by the program code, the program code comprising:

obtaining code configured to cause at least one of the at least one processor to obtain a multimedia file corresponding to an acting role;

first determining code configured to cause at least one of the at least one processor to determine a role feature of the acting role based on the multimedia file;

decoding code configured to cause at least one of the at least one processor to obtain a video playing request including a video identifier of a target video, and decode the target video to obtain a data frame and a playing timestamp corresponding to the data frame, the data frame comprising at least one of a video frame and an audio frame;

identification code configured to cause at least one of the at least one processor to identify, in the data frame of the target video, a target data frame that matches the role feature;

labeling code configured to cause at least one of the at least one processor to automatically label a segment in which performance of the acting role appears in the target video based on a playing timestamp of the target data frame;

first displaying code configured to cause at least one of the at least one processor to display a playing interface of the target video, in which the target video is being played, and receive a user operation to select an area, including at least one face area, on the playing interface of the target video; and second displaying code configured to cause at least one of the at least one processor to, based on the user operation to select the area on the playing interface of the target video, display, on the playing interface to be superimposed on the target video, a list of (i) a "watch-only" option, (ii) an "ignore" option, and (iii) a "fast-forward" option, (i) the "watch-only" option being configured to trigger, upon selection, playing of the target video such that only first segments, within the target video in which performance of at least one acting role corresponding to the at least one face area included in the selected area appears, are played, (ii) the "ignore" option being configured to trigger, upon selection, playing of the target video such that playing of the first segments within the target video is skipped and segments other than the first segments in the target video are played, and (iii) the "fast-forward" option being configured to trigger, upon selection, playing of the target video such that playing of the first segments within the target video is performed at a preset fast-forward speed, wherein, based on the "ignore" option being selected, at a start time of a performance segment of the at least one acting role corresponding to the at least one face area, the playing of the target video jumps to an end time of the performance segment, wherein based on one of (i) the "watch-only" option, (ii) the "ignore" option, and (iii) the "fast-forward" option being triggered, the first segments is displayed in a distinctive manner, with respect to at least one of a color, a thickness, a brightness, or a filter pattern, from other segments of the target video in a playing progressive bar of the playing interface of the target video, and wherein based on a first drawing pattern of the user operation to select the area on the playing interface of the target video, the "watch-only" option is selected by default in the list for the user to confirm to trigger, and based on a second drawing pattern of the user operation to select the area on the playing interface of the target video, the "ignore" option is selected by default in the list for the user to confirm to trigger.

11. The apparatus according to claim 10, wherein the role feature comprises a voiceprint feature of the acting role, and the identification code causes at least one of the at least one processor to identify, in the audio frame of the target video, a target audio frame that matches the voiceprint feature.

12. The apparatus according to claim 11, wherein the obtaining code causes at least one of the at least one processor to obtain in-play audio data of the acting role, the in-play audio data being audio data of the acting role in the target video, and
wherein the voiceprint feature comprises the voiceprint feature of the acting role extracted from the in-play audio data.

13. The apparatus according to claim 11, wherein the obtaining code comprises:
code configured to cause at least one of the at least one processor obtain a cast list of the target video; and
code configured to cause at least one of the at least one processor to perform (i) capturing actor audio data from a network resource based on a name of a voice actor of the acting role in the cast list, or (ii) based on a determination that the name of the voice actor of the acting role does not exist in the cast list, obtaining a name of a leading actor of the acting role, and capturing actor audio data from the network resource based on the name of the leading actor, and
wherein the role feature comprises an audio feature of the acting role extracted from the actor audio data.

14. The apparatus according to claim 10, wherein the role feature comprises a face feature of the acting role, and the identification code causes at least one of the at least one processor to identify, in an image frame of the target video, a target image frame that matches the face feature.

15. The apparatus according to claim 14, wherein the obtaining code causes at least one of the at least one processor to obtain stills image data of the acting role, the stills image data being stills of the acting role in the target video, and
wherein the role feature comprises the face feature of the acting role extracted from the stills image data.

16. The apparatus according to claim 14, wherein the obtaining code causes at least one of the at least one processor to obtain a cast list of the target video, and capture an actor image from a character encyclopedia page based on an actor name of the acting role in the cast list, and
wherein the role feature comprises the face feature of the acting role extracted from the actor image.

17. The apparatus according to claim 16, wherein the program code further comprises:
code configured to cause at least one of the at least one processor to, based on at least two actor images corresponding to the actor name in the character encyclopedia page, obtain an image shooting time corresponding to the at least two actor images; and
code configured to cause at least one of the at least one processor to extract the face feature from an acting role image of which the image shooting time is closest to a video shooting time of the target video.

18. The apparatus according to claim 10, wherein the labeling code causes at least one of the at least one processor to:
based on the target data frame comprising at least one target image frame, combine consecutive timestamps of the at least one target image frame to obtain at least one piece of first segment information of the acting role; or
based on the target data frame comprising at least one target audio frame, combine consecutive timestamps of the at least one target audio frame to obtain at least one piece of second segment information of the acting role; or
based on the target data frame comprising the at least one target image frame and the at least one target audio frame, combine consecutive timestamps of the at least one target image frame to obtain the at least one piece of first segment information of the acting role; combine consecutive timestamps of the at least one target audio frame to obtain the at least one piece of second segment information of the acting role; and obtain third segment information of the acting role based on a combination of the at least one piece of first segment information and the at least one piece of second segment information.

19. A non-transitory computer readable storage medium, storing program code executable by at least one processor to cause the at least one processor to perform:
obtaining a multimedia file corresponding to an acting role;
determining a role feature of the acting role based on the multimedia file;
obtaining a video playing request including a video identifier of a target video, and decoding the target video to obtain a data frame and a playing timestamp corresponding to the data frame, the data frame comprising at least one of a video frame and an audio frame;
identifying, in the data frame of the target video, a target data frame that matches the role feature;
automatically labeling a segment in which performance of the acting role appears in the target video based on a playing timestamp of the target data frame;

displaying a playing interface of the target video, in which the target video is being played, and receiving a user operation to select an area, including at least one face area, on the playing interface of the target video; and based on the user operation to select the area on the playing interface of the target video, displaying, on the playing interface to be superimposed on the target video, a list of (i) a "watch-only" option, (ii) an "ignore" option, and (iii) a "fast-forward" option, (i) the "watch-only" option being configured to trigger, upon selection, playing of the target video such that only first segments within the target video, in which performance of at least one acting role corresponding to the at least one face area included in the selected area appears, are played, (ii) the "ignore" option being configured to trigger, upon selection, playing of the target video such that playing of the first segments within the target video is skipped and segments other than the first segments in the target video are played, and (iii) the "fast-forward" option being configured to trigger, upon selection, playing of the target video such that playing of the first segments within the target video is performed at a preset fast-forward speed, wherein, based on the "ignore" option being selected, at a start time of a performance segment of the at least one acting role corresponding to the at least one face area, the playing of the target video jumps to an end time of the performance segment, wherein based on one of (i) the "watch-only" option, (ii) the "ignore" option, and (iii) the "fast-forward" option being triggered, the first segments is displayed in a distinctive manner, with respect to at least one of a color, a thickness, a brightness, or a filter pattern, from other segments of the target video in a playing progressive bar of the playing interface of the target video, and wherein based on a first drawing pattern of the user operation to select the area on the playing interface of the target video, the "watch-only" option is selected by default in the list for the user to confirm to trigger, and based on a second drawing pattern of the user operation to select the area on the playing interface of the target video, the "ignore" option is selected by default in the list for the user to confirm to trigger.

\* \* \* \* \*